(12) United States Patent
Ban et al.

(10) Patent No.: US 10,440,091 B2
(45) Date of Patent: Oct. 8, 2019

(54) COMMUNICATION METHOD, ELECTRONIC DEVICE AND STORAGE MEDIUM

(71) Applicant: Samsung Electronics Co., Ltd., Gyeonggi-do (KR)

(72) Inventors: Hyong-Jin Ban, Gyeonggi-do (KR); Tae-Sun Yeoum, Seoul (KR); Ji-Hye Kang, Gyeonggi-do (KR); Keon-Ho Kim, Gyeonggi-do (KR); Eo-Jin Ham, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 394 days.

(21) Appl. No.: 14/942,632

(22) Filed: Nov. 16, 2015

(65) Prior Publication Data
US 2016/0142467 A1 May 19, 2016

(30) Foreign Application Priority Data
Nov. 14, 2014 (KR) .................. 10-2014-0159043

(51) Int. Cl.
*H04L 29/08* (2006.01)
*H04L 29/06* (2006.01)

(52) U.S. Cl.
CPC ............ *H04L 67/02* (2013.01); *H04L 65/105* (2013.01); *H04L 65/1006* (2013.01); *H04L 65/1016* (2013.01); *H04L 65/1069* (2013.01); *H04L 67/34* (2013.01)

(58) Field of Classification Search
CPC . H04L 67/02; H04L 65/1006; H04L 65/1016; H04L 65/105; H04L 65/1069; H04L 67/34

USPC ........................................................ 709/219
See application file for complete search history.

(56) References Cited

U.S. PATENT DOCUMENTS

| | | | | |
|---|---|---|---|---|
| 2013/0117555 | A1* | 5/2013 | Yang | H04L 63/0428 713/151 |
| 2014/0222894 | A1 | 8/2014 | Gangadharan et al. | |
| 2014/0223452 | A1* | 8/2014 | Santhanam | G06F 9/541 719/328 |
| 2014/0324979 | A1 | 10/2014 | Gao et al. | |
| 2014/0325078 | A1* | 10/2014 | Shan | H04W 4/70 709/227 |
| 2014/0379931 | A1* | 12/2014 | Gaviria | H04L 65/1016 709/227 |
| 2015/0033300 | A1* | 1/2015 | Timariu | H04L 63/168 726/5 |
| 2015/0081769 | A1* | 3/2015 | Mandyam | H04W 4/005 709/203 |

(Continued)

FOREIGN PATENT DOCUMENTS

| | | |
|---|---|---|
| KR | 1020140053791 | 5/2014 |
| WO | WO 2013108121 | 7/2013 |
| WO | WO 2014075250 | 5/2014 |

*Primary Examiner* — Tauqir Hussain
(74) *Attorney, Agent, or Firm* — The Farrell Law Firm, P.C.

(57) ABSTRACT

Provided is a communication method of an electronic device, including executing a web browser, requesting registration in an IP multimedia core network subsystem (IMS) using a first client associated with the web browser, and displaying, in a part of the web browser using the first client, information associated with a network to which the electronic device is connected.

17 Claims, 20 Drawing Sheets

(56) References Cited

U.S. PATENT DOCUMENTS

| | | | |
|---|---|---|---|
| 2015/0200946 A1* | 7/2015 | Horn | H04L 63/08 726/4 |
| 2015/0229635 A1* | 8/2015 | Saridaki | H04L 65/1006 726/8 |
| 2015/0280963 A1* | 10/2015 | Bollapalli | H04L 41/0206 709/227 |
| 2015/0373056 A1* | 12/2015 | Bouthemy | H04L 65/1006 709/203 |
| 2016/0105468 A1* | 4/2016 | Mufti | H04L 65/1069 709/228 |
| 2016/0119788 A1* | 4/2016 | Mandyam | H04L 63/0876 455/411 |
| 2016/0191523 A1* | 6/2016 | Jian | H04L 67/02 726/4 |
| 2017/0141934 A1* | 5/2017 | Ding | H04L 12/66 |

\* cited by examiner

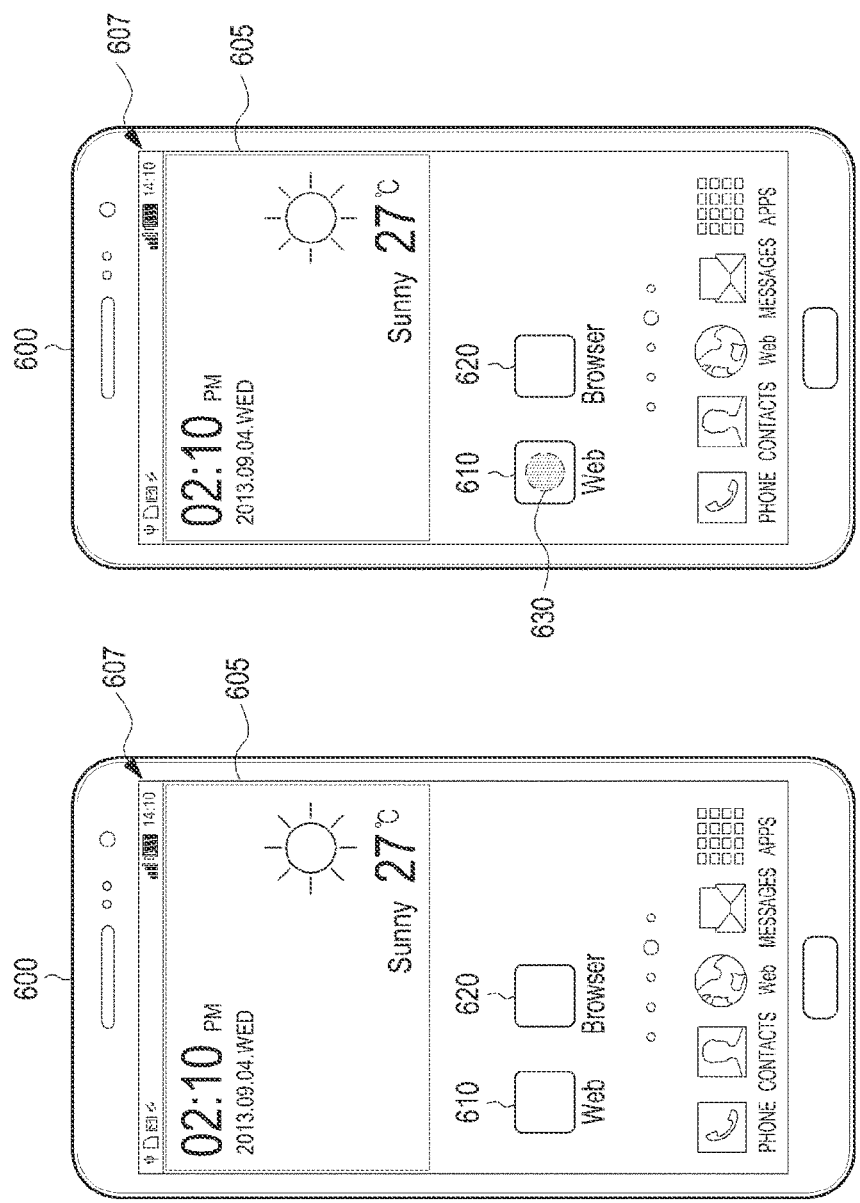

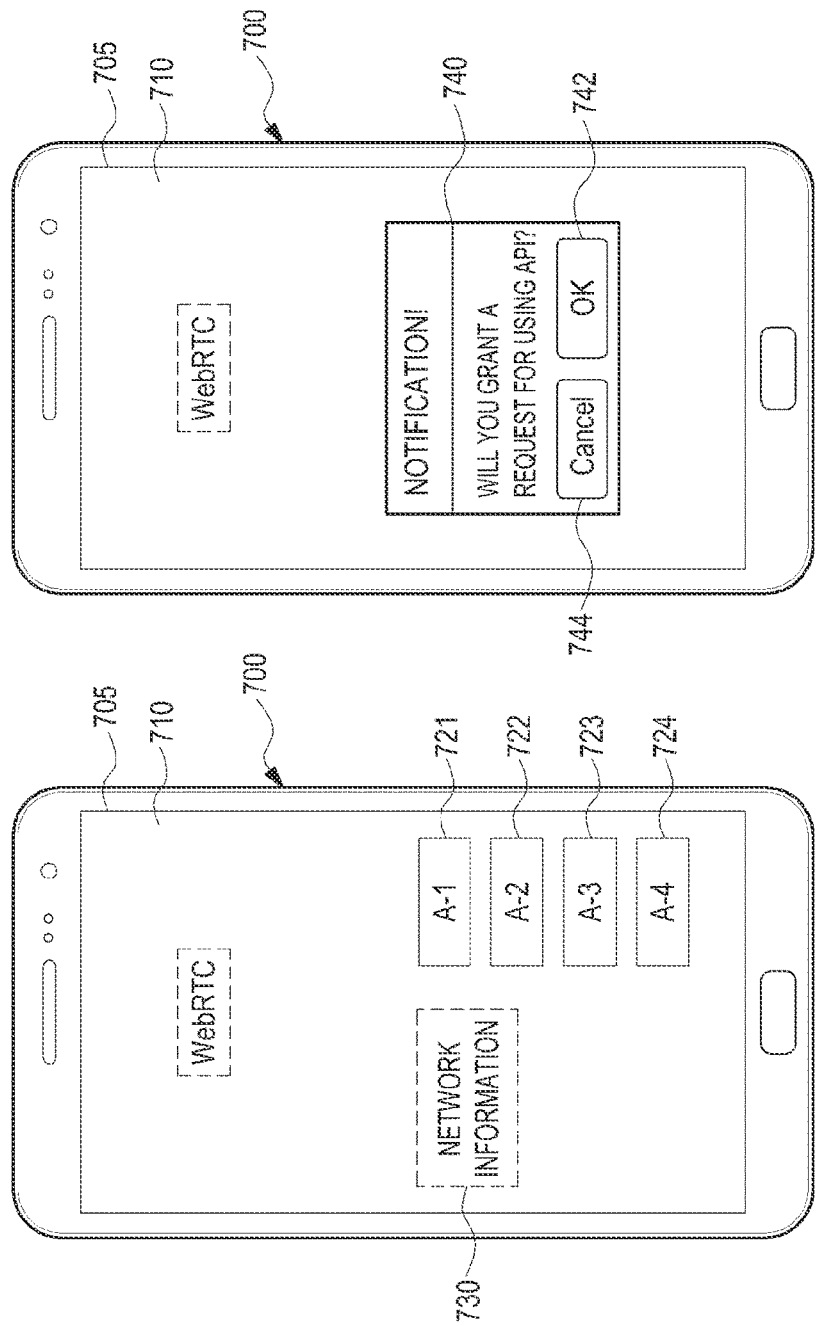

COMMUNICATION METHOD, ELECTRONIC DEVICE AND STORAGE MEDIUM

PRIORITY

This application claims priority under 35 U.S.C. § 119(a) to Korean Application Serial No. 10-2014-0159043, which was filed in the Korean Intellectual Property Office on Nov. 14, 2014, the contents of which incorporated herein by reference.

BACKGROUND

1. Field of the Disclosure

The present disclosure relates to an electronic device and a method that provides web real-time communication (WebRTC) service.

2. Description of the Related Art

WebRTC is a technology that provides voice calls, video chat, video telephone (VT) or video call, video conferencing, and file transfer through browser applications without the additional installation of a plug-in.

WebRTC enables a voice/video call between terminals through a web browser that conforms to the standard established by W3C. A terminal downloads a web application that is written in Javascript and HTML5 from a web server, executes the web application, executes signaling to establish a call through a web server, and may exchange voice/video media packets between terminals through an RTP packet.

To enable the voice/video call between terminals by connecting to an existing mobile communication network through a web browser, there is a need for a method in which the web browser may access a subscriber identity module (SIM) end that has such information as mobile communication network subscriber information and authentication information.

A web application for web-based communication may be executed in a sandbox environment according to the characteristics of a web browser that considers security to be vital, and the access to user personal information, file systems, or physical resources of a communication device is strictly prohibited. Therefore, in WebRTC, the application programming interface (API) for an existing voice call through a circuit network is not standardized, and a voice/video call using an existing communication network may not be provided.

Furthermore, a call through a web browser may not be switched into a call through an existing network, or vice versa.

As such, there is a need in the art for a method by which a voice/video call function of an existing network may be used in a web browser.

SUMMARY

The present disclosure has been made to address the above-mentioned problems and disadvantages, and to provide at least the advantages described below.

Accordingly, an aspect of embodiments of the present disclosure is to provide a voice/video call function of an existing mobile communication network that may be used in a web browser.

Another aspect of the present disclosure is to provide a method by which a WebRTC client registers in an existing IMS network and receives an IMS service by providing a web browser with a SIM information acquisition API and a PDN connection API.

A further aspect of the present disclosure is to enable, by using a local web server and a local media gateway embedded in an electronic device, a WebRTC client to execute a voice/video call through a $3^{rd}$ generation partnership project (3GPP/3GPP2) circuit switched (CS) network without separate support for WebRTC in a mobile communication network.

Another aspect of the present disclosure is to enable a WebRTC client to support a single radio voice call continuity (SRVCC) function.

Another aspect of the present disclosure is to provide a rich service that does not require a user to disconnect a call, by enabling switching between a web application (web app) and a native application (native app).

According to an aspect of the present disclosure, a communication method of an electronic device includes executing a web browser, requesting registration in an internet protocol (IP) multimedia core network subsystem (IMS) using a first client associated with the web browser, and displaying information associated with a network to which the electronic device is connected, in a part of the web browser, using the first client.

According to another aspect of the present disclosure, an electronic device includes a display, a communication processor (CP) that is configured to communicate with an IMS or 3rd generation partnership project (3GPP)/3rd generation partnership project 2(3GPP2) circuit switched (CS) network, and a controller that is configured to execute a web browser, request registration in the IMS through the CP using the first client associated with the web browser, and display, in a part of the web browser through the display, using the first client, information associated with the network to which the electronic device is connected.

According to another aspect of the present disclosure, disclosed is a non-transitory machine-readable storage medium that records a program for implementing a communication method of an electronic device, wherein the method includes executing a web browser, requesting registration in an IMS using a first client associated with the web browser, and displaying, in a part of the web browser, information associated with a network to which the electronic device is connected, using the first client.

BRIEF DESCRIPTION OF THE DRAWINGS

The above and other aspects, features, and advantages of the present disclosure will be more apparent from the following detailed description taken in conjunction with the accompanying drawings, in which:

FIGS. 6A, 6B, 7A and 7B illustrate a communication method of an electronic device;

DETAILED DESCRIPTION OF EMBODIMENTS OF THE DISCLOSURE

Figure 1:
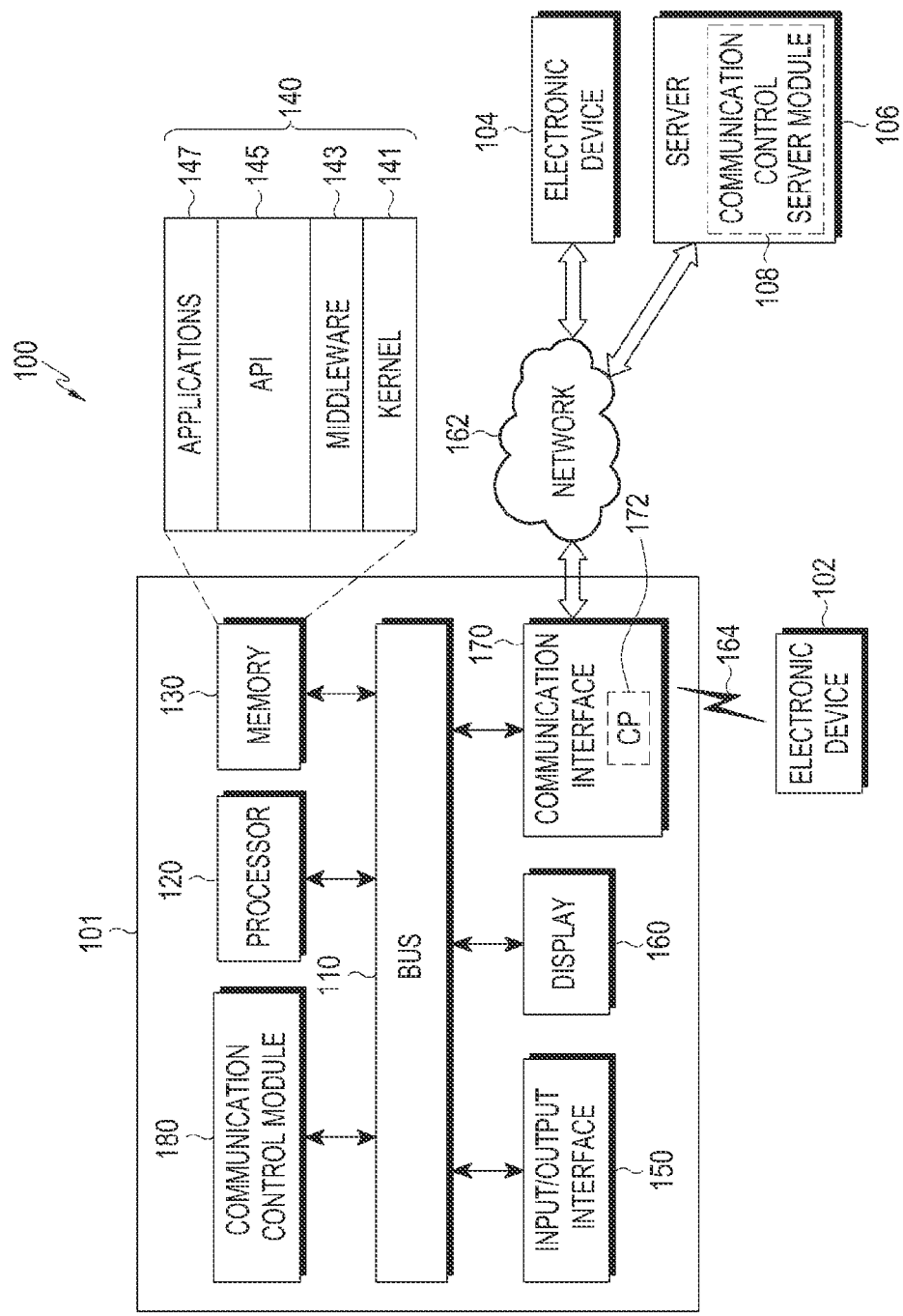
FIG. 1 illustrates a network environment containing an electronic device according to embodiments of the present disclosure.

Hereinafter, embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. A detailed description of related known configurations or functions incorporated herein will be omitted for the sake of clarity and conciseness.

In the present disclosure, the expression "have", "may have", "include" and "may include" refer to existence of a corresponding feature such as numerical value, function, operation, or components such as elements, and does not exclude existence of additional features.

In the present disclosure, the expressions "A or B", "at least one of A or/and B", and "one or more of A or/and B" may include all possible combinations of the items listed. For example, the expressions "A or B", "at least one of A and B", and "at least one of A or B" refer to all of (1) including at least one A, (2) including at least one B, and (3) including all of at least one A and at least one B.

The expressions "a first", "a second", "the first", and "the second" used in embodiments of the present disclosure may modify various components regardless of the order and/or the importance but do not limit the corresponding components. The above expressions are used merely for the purpose of distinguishing an element from the other elements. For example, a first user device and a second user device indicate different user devices although both are user devices. For example, a first element may be termed a second element, and similarly, a second element may be termed a first element without departing from the scope of the present disclosure.

It should be understood that when a first element is referred to as being operatively or communicatively "connected," or "coupled," to a second element, the connection may be direct or a third element may be interposer between the first and second elements. In contrast, it may be understood that when a first element is referred to as being "directly connected," or "directly coupled" to a second element), there is no element interposed between the first and second elements.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may indicate that the device, together with other devices or components, "is able to". For example, the phrase "processor adapted (or configured) to perform A, B, and C" may indicate a dedicated or embedded processor only for performing the corresponding operations or a generic-purpose processor such as central processing unit (CPU) or application processor (AP) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a conventional dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a motion pictures experts group (MPEG) layer audio 3 (MP3) player, a mobile medical appliance, a camera, and a wearable device such as a head-mounted-device (HMD) including but not limited to electronic glasses, electronic clothes, an electronic bracelet, an electronic necklace, an electronic appcessory, electronic tattoos, and a smart watch.

According to some embodiments, the electronic device may be a smart home appliance including at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box such as Samsung HomeSync™, Apple TV™, or Google TV™, a game console such as Xbox™ and PlayStation™, an electronic dictionary, an electronic key, a camcorder, and an electronic photo frame.

According to another embodiment, the electronic device may include at least one of various medical devices such as various portable medical measuring devices including, but not limited to a blood glucose monitoring device, a heart rate monitoring device, a blood pressure measuring device, and a body temperature measuring device, a magnetic resonance angiography (MRA) device, a magnetic resonance imaging (MRI) device, a computed tomography (CT) machine, and an ultrasonic machine, a navigation device, a global positioning system (GPS) receiver, an event data recorder (EDR), a flight data recorder (FDR), vehicle infotainment devices, an electronic devices for a ship such as a ship navigation device and a gyro-compass, avionics, security devices, an automotive head unit, a robot for home or industry, an automatic teller's machine (ATM), point of sales (POS) in a shop, or Internet of things (IoT) device such as a light bulb, various sensors, electric or gas meter, a sprinkler device, a fire alarm, a thermostat, a streetlamp, a toaster, a sporting goods, a hot water tank, a heater, or a boiler.

According to some embodiments, the electronic device may include at least one of a part of furniture or a building/structure, an electronic board, an electronic signature receiving device, a projector, and various types of measuring instruments such as a water meter, an electric meter, a gas meter, and a radio wave meter.

The electronic device according to embodiments of the present disclosure may be a combination of one or more of the aforementioned various devices, and may be a flexible device. The electronic device according to an embodiment of the present disclosure is not limited to the aforementioned devices, and may include a new electronic device according to the development of technology.

Hereinafter, an electronic device according to embodiments will be described with reference to the accompanying drawings. As used herein, the term "user" may indicate a person who uses an electronic device or a device such as an artificial intelligence electronic device) that uses an electronic device.

FIG. 1 illustrates a network environment including an electronic device according to embodiments of the present disclosure.

Referring to FIG. 1, an electronic device 101 within a network environment 100 includes a bus 110, a processor 120, a memory 130, an input/output interface 150, a display 160, a communication interface 170, and a communication control module 180. The electronic device 101 may omit at least one of the above components or further include additional components.

The bus 110 includes a circuit for connecting the components 120, 130, 150, 160, 170 and 180 and transmitting communication such as control messages and/or data between the components.

The processor 120 includes one or more of a central processing unit (CPU), an application processor (AP), and a communication processor (CP). The processor 120 controls, for example, one or more other components of the electronic device 101 and/or processes an operation or data related to communication. The processor 120 may be referred to as a controller, may include the controller as a part thereof, or may constitute the controller.

The memory 130 includes a volatile memory and/or a non-volatile memory. The memory 130 stores, for example, instructions or data related to at least one other component of the electronic device 101. According to an embodiment, the memory 130 stores software and/or a program 140 that includes, for example, a kernel 141, middleware 143, an application programming interface (API) 145, and applications 147. At least some of the kernel 141, the middleware 143, and the API 145 may be referred to as an operating system (OS).

For example, the kernel 141 controls or manages system resources such as the bus 110, the processor 120, and the memory 130 which are used to execute an operation or a function implemented in the other programs such as the middleware 143, the API 145, and the applications 147. The kernel 141 provides an interface through which the middleware 143, the API 145, or the application program 147 may access individual components of the electronic device 101 to control or manage system resources.

For example, the middleware 143 serves as a relay for allowing the API 145 or the application programs 147 to communicate with the kernel 141 to exchange data. In regard to task requests received from the application program 147, the middleware 143 performs a control such as scheduling or load balancing for the task requests using, for example, a method of assigning at least one application a priority for using the system resources such as the bus 110, the processor 120 or the memory 130, of the electronic device 101.

The API 145 is an interface by which the applications 147 control functions provided from the kernel 141 or the middleware 143, and includes, for example, at least one interface or function such as instructions for file control, window control, image processing, or text control.

The input/output interface 150 serves as an interface which can transmit commands or data input from the user or another external device to other component(s) of the electronic device 101, and outputs commands or data received from another component(s) of the electronic device 101 to the user or another external device.

The display 160 includes, for example, a liquid crystal display (LCD), a light emitting diode (LED) display, an organic light emitting diode (OLED) display, a micro electro mechanical system (MEMS) display, or an electronic paper display. For example, the display 160 displays various pieces of content such as text, images, videos, icons, and symbols to the user. The display 160 includes a touch screen and receives, for example, a touch input, a gesture input, a proximity input, or a hovering input using an electronic pen or a user's body part.

For example, the communication interface 170 establishes communication between the electronic device 101 and an external device such as a first electronic device 102, a second electronic device 104, or a server 106. The communication interface 170 may be connected to a network 162 through wireless or wired communication to communicate with the external device, and includes a communication processor (CP) 172 that may be one of a plurality of modules constituting the communication interface 170. In an embodiment of the present disclosure, the CP 172 may also be included in the processor 120.

The wireless communication may, for example, use at least one of long term evolution (LTE), LTE-advanced (LTE-A), code division multiple access (CDMA), wideband CDMA (WCDMA), universal mobile telecommunication system (UMTS), wireless broadband (WiBro), and global system for mobile communications (GSM). The wired communication includes, for example, at least one of a universal serial bus (USB), a high definition multimedia interface (HDMI), recommended standard 232 (RS-232), and a plain old telephone service (POTS). The network 162 includes a telecommunication network, for example, at least one of a computer network such as local area network (LAN) or wideband area network (WAN), the Internet, a telephone network, an IP multimedia core network subsystem (IMS), a packet data network (PDN), and a 3GPP/3GPP2 CS network.

Each of the first and second external electronic devices 102 and 104 may be the same as or different from the electronic device 101. According to an embodiment, the server 106 includes a group of one or more servers. According to embodiments, all or some of the operations performed by the electronic device 101 may be performed by another electronic device or a plurality of electronic devices such as the electronic device 102 or 104 or the server 106. According to an embodiment, when the electronic device 101 performs some functions or services automatically or by request, the electronic device 101 may make a request for performing at least some of the functions related to the functions or services to another device such as the electronic device 102 or 104 or the server 106 instead of performing the functions or services by itself. The other electronic device executes the requested function or the additional function and transfers the result, obtained by carrying out the function, to the electronic device 101. The electronic device 101 provides the requested functions or services based on the received result as it is or after additionally processing the received result. To achieve this, for example, cloud computing, distributed computing, or client-server computing technology may be used.

According to an embodiment, the service providing module 180 supports driving of the electronic device 101 by performing at least one of the operations or functions implemented by the electronic device 101. For example, the server 106 includes a communication control server module 108 capable of supporting the communication control module 180 implemented in the electronic device 101, and the communication control server module 108 includes at least one component of the communication control module 180, and performs, as a proxy, at least one of the operations performed by the communication control module 180.

The communication control module 180 processes at least some of the information obtained from other components such as at least one of the processor 120, the memory 130, the input/output interface 150, and the communication interface 170, and utilizes the information in various manners. For example, the communication control module 180 controls at least some functions of the electronic device 101 by using the processor 120 or independently therefrom so that the electronic device 101 may interwork with other electronic devices such as the electronic device 104 or the server 106. The communication control module 180 may be integrated into the processor 120 or the communication interface 170. According to an embodiment, at least one component of the communication control module 180 may be included in the server 106 and receives at least one operation, which is performed by the communication control module 180, from the server 106. Additional information on the communication control module 180 is provided in FIG. 3 described below.

Figure 2:
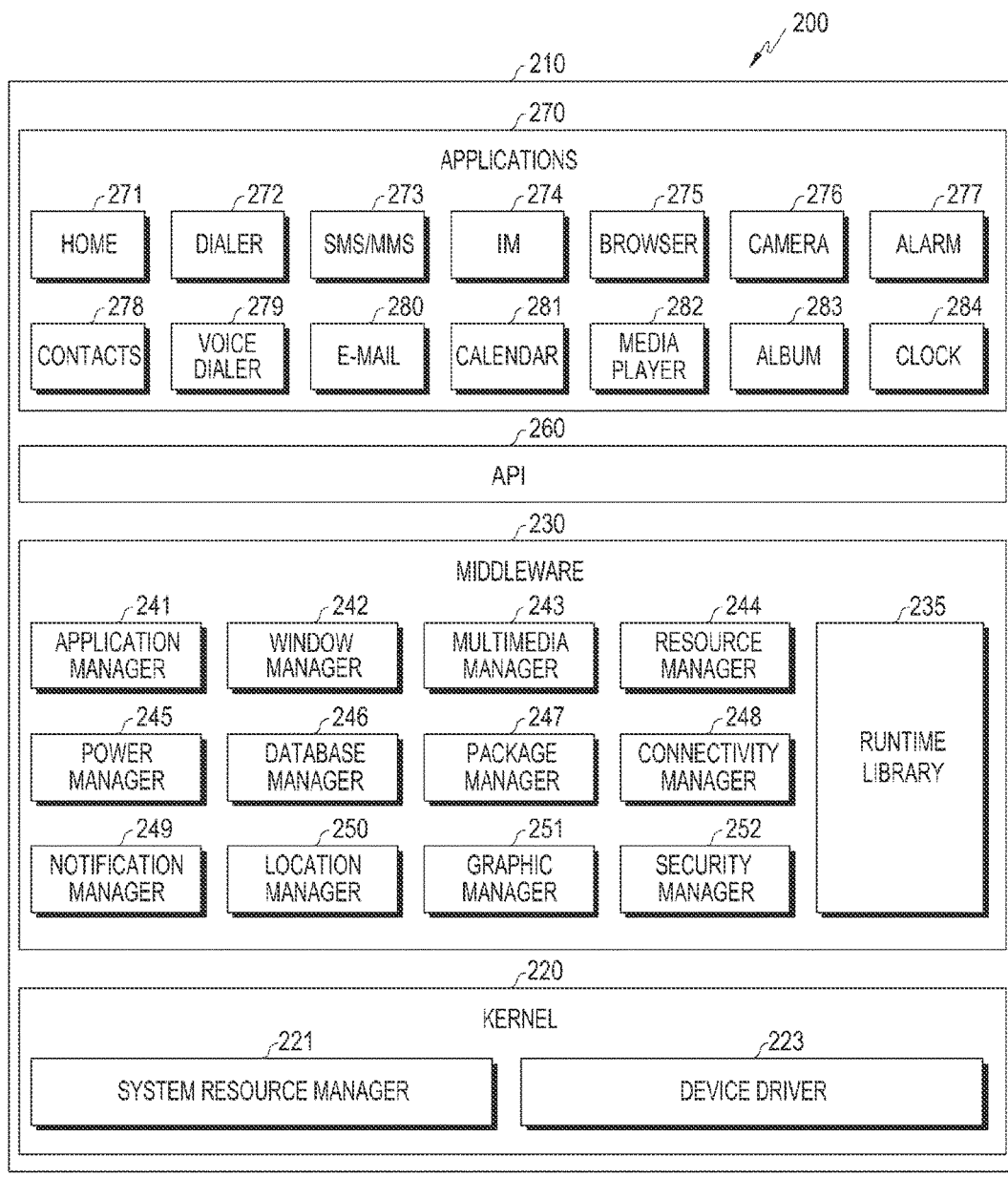
FIG. 2 illustrates a program module according to embodiments of the present disclosure.

FIG. 2 is a block diagram 200 of a program module 210 according to embodiments of the present disclosure. According to an embodiment, the program module 210 includes an operating system (OS) for controlling resources related to the electronic device 101 and/or various applications 147 executed in the operating system. The operating system may be, for example, Android™, iOS, Windows™, Symbian, Tizen, or Bada.

The programming module 210 includes a kernel 220, middleware 230, an application programming interface (API) 260, and/or an application 270. At least some of the program module 210 may be preloaded in the electronic device or downloaded in a server.

The kernel 220 includes, for example, a system resource manager 221 and a device driver 223. The system resource manager 221 controls, allocates, or collects the system resources. According to an embodiment, the system resource manager 221 includes a process manager, a memory manager, or a file system manager. The device driver 223 includes, for example, a display driver, a camera driver, a Bluetooth® driver, a shared-memory driver, a universal serial bus (USB) driver, a keypad driver, a wireless fidelity WiFi driver, an audio driver, or an inter-process communication (IPC) driver.

The middleware 230 provides a function required by the applications 270 in common or provides various functions to the applications 270 through the API 270 so that the applications 260 may efficiently use limited system resources of the electronic device. According to an embodiment, the middleware 230 includes, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The run time library 235 includes, for example, a library module that a compiler uses in order to add new functions through a programming language while the applications 270 are executed. The run time library 235 performs input/output management, memory management, or a function for an arithmetic function.

The application manager 241 manages, for example, a life cycle of at least one application among the applications 270. The window manager 242 manages a graphical user interface (GUI) resource used in a screen. The multimedia manager 243 detects a format required for reproducing various media files and encodes or decodes a media file using a codec appropriate for the corresponding format. The resource manager 244 manages resources such as a source code, a memory or a storage space of at least one application among the applications 270.

The power manager 245 operates together with, for example, a basic input/output system (BIOS), so as to manage a battery or power and provides power information required for the operation of the electronic device. The database manager 246 generates, searches for, or changes a database to be used by at least one of the applications 270. The package manager 247 manages the installation or updating of applications distributed in the form of a package file.

For example, the connectivity manager 248 manages wireless connections, such as WiFi or Bluetooth®. The notification manager 249 displays or notifies an event such as a received message, an appointment, or a proximity notification to a user without disturbance. The location manager 250 manages location information of the electronic device. The graphic manager 251 manages graphic effects to be provided to a user and user interfaces related to the graphic effects. The security manager 252 provides various security functions required for system security or user authentication. According to an embodiment, when the electronic device has a call function, the middleware 230 may further include a telephony manager for managing a voice call function or a video call function of the electronic device.

The middleware 230 includes a middleware module for forming a combination of various functions of the aforementioned components. The middleware 230 provides a module specialized for each type of operating system in order to provide a differentiated function. In addition, a few existing components may be dynamically removed from the middleware 230, or new components may be added to the middleware 230.

The API 260, which is a set of API programming functions, may be provided in a different configuration for each operating system. For example, in the case of Android™ or iOS, one API set may be provided for each platform. In the case of Tizen, two or more API sets may be provided for each platform.

The applications 270 include one or more applications of a home 271, a diary 272, a short message service/multimedia messaging service (SMS/MMS) 273, instant message (IM) 274, browser 275, camera 276, alarm 277, contact information 278, voice dial 279, e-mail 280, calendar 281, media player 282, album 283, and clock 284 applications, as well as health care applications such as an application for measuring an amount of exercise or blood sugar, and an environmental information application such as an application for providing atmospheric pressure, humidity, or temperature information.

According to an embodiment, the applications 270 include an information exchange application for supporting information exchange between the electronic device and external electronic devices. The information exchange application includes, for example, a notification relay application for transmitting predetermined information to the external electronic device, or a device management application for managing the external electronic device.

For example, the notification relay application includes a function of transferring, to the external electronic device 102 or 104, notification information generated from other applications of the electronic device 101 such as an SMS/MMS application, an e-mail application, a health management application, or an environmental information application. The notification relay application receives notification information from an external electronic device and provides the received notification information to a user. The device management application manages (such as installs, deletes, or updates) a function for at least a part of the external electronic device communicating with the electronic device, such as turning on/off all or part of the external electronic device or adjusting brightness or resolution of a display, applications executed in the external electronic device, or services provided from the external electronic device such as a telephone call service or a message service.

According to an embodiment, the applications 270 include a health management application designated according to attributes of the electronic device such as the type of electronic device which corresponds to a mobile medical device. According to an embodiment, the applications 270 include an application received from the external electronic device, and a preloaded application or a third party application which can be downloaded from the server. Names of the elements of the program module 210, according to the above-described embodiments of the present disclosure, may change depending on the type of OS.

According to embodiments of the present disclosure, at least some of the program module 210 may be implemented in software, firmware, hardware, or a combination of two or more thereof. At least some of the programming module 210 may be implemented by, for example, the processor. At least some of the programming module 210 includes, for example, a module, program, routine, sets of instructions, or process for performing one or more functions.

Figure 3:
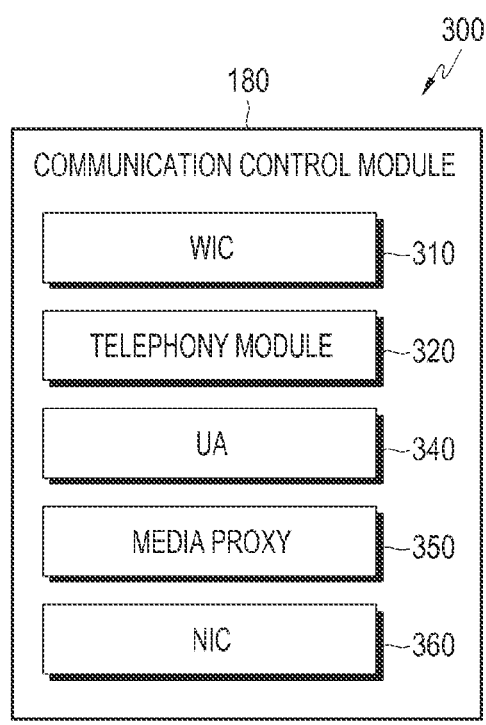
FIG. 3 illustrates a communication control module of an electronic device according to embodiments of the present disclosure.

FIG. 3 is a block diagram 300 of the communication control module 180 of an electronic device according to embodiments of the present disclosure.

Referring to FIG. 3, the communication control module 180 includes at least a few, or all, of the components, which are a WebRTC IMS Client (WIC) 310 corresponding to a first client, a telephony module 320, a user agent (UA) 340 corresponding to a user agent, a media proxy 350, and a native IMS client (NIC) 360 corresponding to a second client. The communication control module 180 may be provided separately from a processor or a controller, or a part, or the entirety, of the communication control module 180 may be integrated into the processor or the controller.

The WIC 310, according to embodiments of the present disclosure, is configured to provide a real time communication service such as web real-time communication (WebRTC) by controlling a web browser. The WIC 310 receives real time communication data from a partner device through an IMS PDN or 3GPP/3GPP2 CS network. The WIC 310 outputs the real time communication data using a web browser. The web browser is configured to access a web server or a website in order to download a webpage from the web server or the website, and to display the webpage.

For example, the web browser may be executed by a user input to communicate with a partner device or to execute an application such as a web browser, the WIC 310, or a web application or automatic settings, and the screen of the web browser, or a screen that provides a WebRTC service, may be displayed on the display of the electronic device.

In a 3GPP/3GPP2 CS network such as a 3G network, WCDMA, or CDMA2000, a dedicated-communication circuit (or channel) is provided between two network nodes and the circuit may be maintained during a communication session. In a PDN such as LTE), data is transmitted by being divided into packets, and network links may be shared by the packets from a plurality of sessions. An IP Multimedia Core Network Subsystem (IMS) may: provide an interface with respect to the PDN and/or the 3GPP/3GPP2 CS network; include a part or the entirety of the PDN; or form a part of the PDN.

The IMS includes at least one of an eP-CSCF (Proxy-CSCF (Call Session Control Function) enhanced for WebRTC) that transmits a message or data received from an electronic device to an I-CSCF or an S-CSCF, an interrogating CSCF (I-CSCF) that executes routing a received message or data to an S-CSCF, a serving CSCF (S-CSCF) that registers an electronic device, executes routing a message received from a PDN or a 3GPP/3GPP2 CS network to an eP-CSCF (or an electronic device), executes routing a message received from an eP-CSCF (or an electronic device) to a PDN or a 3GPP/3GPP2 CS network, and an IMS access gateway enhanced for WebRTC (eIMS-AGW) that executes transcoding.

The web browser detects a user input, accesses a web server or a website that provides a WebRTC connection through a communication module such as the communication processor (CP) 172 or a WiFi module, and receives loading data for loading the WIC 310 from the web server. The controller or the web browser loads the WIC 310 onto the electronic device using the loading data. The WIC 310 may be loaded so as to interwork with the web browser, or may be loaded independently from the web browser.

The telephony module 320, according to embodiments of the present disclosure, is configured to communicate with each of the WIC 310 and the CP.

According to an embodiment of the present disclosure, the WIC 310 executes a control using a first API so as to enable the telephony module 320 to request a PDN connection from the CP. In response to the request of the WIC 310, the telephony module 320 requests a PDN connection from the CP. In response to the request of the telephony module 320, the CP establishes the PDN connection. The WIC 310 receives information associated with the communication connection such as information associated with a device or a server in the PDN, from the CP through the telephony module 320.

According to an embodiment of the present disclosure, the first API may be included in the web browser, which receives a request for using the first API from the WIC 310, and displays a query associated with the use of the first API, or displays a screen part/area such as a message or a popup window including the query. The web browser receives a user input associated with the use of the first API, and may or may not execute an operation using the first API in response to the user input, such as grant or refusal. When an input indicating grant is received from the user, the web browser requests a communication connection between the electronic device and the PDN from the telephony module 320.

According to an embodiment of the present disclosure, the communication connection between the electronic device and the PDN (or a device or a server in the PDN) includes a web socket connection. The WIC 310 transmits a message that requests a web socket connection to the eP-CSCF through the CP, and the WIC 310 receives a message including information associated with a web socket connection from the eP-CSCF.

According to an embodiment of the present disclosure, the WIC 310 requests, using a second API, the telephony module 320 to set a packet that is transmitted to a predetermined address to be transmitted using a predetermined PDN, such as a PDN that supports a web socket connection.

According to an embodiment of the present disclosure, the second API may be included in the web browser, which receives a request for using the second API from the WIC 310 and displays a query associated with the use of the second API, or displays a screen part/area that includes the query. The web browser receives a user input associated with the use of the second API, and may or may not execute an operation using the second API in response to the user input, such as grant or refusal. When an input indicating grant is received from the user, the web browser requests the telephony module 320 to set a packet that is transmitted to a predetermined address to be transmitted using a predetermined PDN.

According to an embodiment of the present disclosure, the WIC 310 is configured to request registering, in the IMS or the S-CSCF, subscriber identification information stored in the electronic device.

According to an embodiment of the present disclosure, the WIC 310 is configured to obtain subscriber identification information stored in a SIM of the electronic device, and to transmit a registration message or registration request message containing the subscriber identification information to the IMS or the S-CSCF.

The subscriber identification information includes at least one of an IP multimedia private identity (IMPI) and IP multimedia public identity (IMPU).

According to an embodiment of the present disclosure, the WIC 310 controls the telephony module 320 to request first subscriber identification information such as IMPU, from the CP, using a third API. In response to the request of the WIC 310, the telephony module 320 requests the first subscriber identification information from the CP. In response to the request of the telephony module 320, the CP obtains the first subscriber identification information stored in the SIM. The WIC 310 receives the first subscriber identification information from the CP through the telephony module 320.

According to an embodiment of the present disclosure, the third API may be included in the web browser, which receives a request to use the third API from the WIC 310 and displays a query associated with the use of the third API, or displays a screen part/area that includes the query. The web browser receives a user input associated with the use of the third API, and may or may not execute an operation using the third API in response to the user input, such as grant or refusal). When an input indicating grant is received from the user, the web browser requests the first subscriber identification information from the telephony module 320.

According to an embodiment of the present disclosure, the WIC 310 controls the telephony module 320 to request second subscriber identification information such as IMPU from the CP using a fourth API. In response to the request of the WIC 310, the telephony module 320 requests the second subscriber identification information from the CP. In response to the request of the telephony module 320, the CP obtains the second subscriber identification information stored in the SIM. The WIC 310 receives the second subscriber identification information from the CP through the telephony module 320.

According to an embodiment of the present disclosure, the fourth API may be included in the web browser, which receives a request for using the fourth API from the WIC 310 and displays a query associated with the use of the fourth API, or displays a screen part/area that includes the query. The web browser receives a user input associated with the use of the fourth API, and may or may not execute an operation using the fourth API in response to the user input, such as grant or refusal. When an input indicating grant is received from the user, the web browser requests the second subscriber identification information from the telephony module 320.

According to an embodiment of the present disclosure, the WIC 310 generates a registration message containing subscriber identification information, and transmits the registration message to the IMS or the eP-CSCF through the CP. The eP-CSCF transmits the registration message to the S-CSCF.

According to an embodiment of the present disclosure, the WIC 310 receives, through the CP, a first message (or an authentication request message) that includes a first value for authentication, from the IMS or the eP-CSCF. The WIC 310 controls, using a fifth API, the telephony module 320 to request, from the CP, a second value (or authentication response value for the authentication request) which is generated based on the first value. In response to the request of the WIC 310, the telephony module 320 requests the second value from the CP. In response to the request of the telephony module 320, the CP transfers the first value to the SIM, and obtains the second value from the SIM. The WIC 310 receives the second value from the CP through the telephony module 320. The WIC 310 generates a second message (or an authentication response message) including the second value, and transmits the second message to the IMS (or the eP-CSCF) through the CP. The WIC 310 receives, from the IMS (or the eP-CSCF) through the CP, a third message indicating whether the authentication is successfully executed.

According to an embodiment of the present disclosure, the fifth API may be included in the web browser, which receives a request to use the fifth API from the WIC 310 and displays a query associated with the use of the fifth API, or displays a screen part/area that includes the query. The web browser receives a user input associated with the use of the fifth API, and may or may not execute an operation using the fifth API in response to the user input, such as grant or refusal). When an input indicating grant is received from the user, the web browser requests the second value from the telephony module 320.

According to an embodiment of the present disclosure, the WIC 310 displays information associated with the IMS, the PDN, or the 3GPP/3GPP2 CS network, on/in the web browser, another application or a screen part/area such as a message or a window. For example, the WIC 310 may periodically/aperiodically receive or request, from the CP or another communication module through the telephony module 320, information associated with a currently connected network such as mobile country codes (MCCs), mobile network codes (MNCs), radio access technology (RAT), or received signal strength indication (RSSI), and/or characteristic information such as quality of service (QoS) or security level of a currently used channel or circuit. The WIC 310 displays the information associated with the network in the web browser. For example, the web browser displays an indication that a voice over LTE (VoLTE) call is currently executed through the PDN, that a packet communication is currently executed through the PDN, that a call is executed through a secure channel, that a network is switched between LTE and WiFi, that LTE and WiFi are simultaneously used, and that a charged/free network is used.

According to an embodiment of the present disclosure, the WIC 310 establishes a call connection between the electronic device and a partner device over the 3GPP/3GPP2 CS network, through the CP.

According to an embodiment of the present disclosure, the user agent (UA) 340 corresponding to a user agent is configured to communicate with each of the WIC 310 and the telephony module 320.

According to an embodiment of the present disclosure, the WIC 310 receives a user input through the web browser, and is configured to control the UA 340 so as to enable the CP to establish a call connection between the electronic device and a partner device over the 3GPP/3GPP2 CS network.

According to an embodiment of the present disclosure, the WIC 310 registers in the UA 340 such as by generating a registration message and transmitting the registration message to the UA 340. The WIC 310 transmits, to the UA 340, a message such as an INVITE message that includes identification information such as a uniform resource identifier (URI) or a telephone number of the partner device. The UA 340 requests a call or a CS call to the partner device from the telephony module 320, which requests a call to the partner device from the CP. The CP establishes a call connection between the electronic device and the partner device over the 3GPP/3GPP2 CS network.

A media proxy 350 that corresponds to a media converting module, according to embodiments of the present disclosure, is configured to communicate with each of the WIC 310 and the CP. The media proxy 350 is configured to convert the format of real time communication data received from the partner device or the CP into a format supported by the web browser. The media proxy 350 is configured to convert a format of real time communication data received from the web browser into a format supported by the 3GPP/3GPP2 CS network or the CP.

According to an embodiment of the present disclosure, the WIC 310 is configured to control the UA 340 so that the CP establishes a call connection between the electronic device and a partner device over the 3GPP/3GPP2 CS network. The media proxy 350 converts the format of real time communication data received from the partner device through the call connection and the CP into a format supported by the web browser.

According to an embodiment of the present disclosure, the media proxy 350 receives real time communication data such as pulse-code modulation (PCM) data from the CP, and converts the format of the real time communication data into a format such as a real-time transport protocol (RTP) supported by the web browser. The media proxy 350 transmits the real time communication data, of which the format is converted, to the WIC 310 or the web browser.

According to an embodiment of the present disclosure, the media proxy 350 receives RTP data from the WIC 310 or the web browser, and converts the format of the real time communication data into a format such as PCM supported by the CP or the 3GPP/3GPP2 CS network. The media proxy 350 transmits the real time communication data of which the format is converted, to the CP.

According to an embodiment of the present disclosure, the WIC 310 receives first real time communication data from a partner device through a PDN. The CP receives a signal indicating a handover, in response to which the WIC 310 receives second real time communication data from the partner device through the 3GPP/3GPP2 CS network. The media proxy 350 converts the format of the second real time communication data received through the 3GPP/3GPP2 CS network and the CP into a format supported by the web browser, and transmits, to the WIC 310, the second real time communication data of which the format is converted.

According to an embodiment of the present disclosure, the CP receives first real time communication data through a PDN, during which time the CP receives a signal indicating a handover from the IMS or the PDN. In response to the signal indicating the handover, the CP receives second real time communication data through the 3GPP/3GPP2 CS network. The media proxy 350 converts the format of the second real time communication data received through the 3GPP/3GPP2 CS network into a format supported by the web browser. The media proxy 350 transmits the second real time communication data, of which the format is converted, to the WIC 310.

An NIC 360 according to embodiments of the present disclosure is configured to provide a real time communication service by controlling a phone application.

According to an embodiment of the present disclosure, while real time communication is executed through the web browser, the WIC 310 receives a user input indicating the change of a user interface that provides a real time communication service, and replace the web browser with a phone application, in response to the user input. The WIC 310 controls the media proxy 350 to enable real time communication data received from the partner device to be output through the phone application.

According to an embodiment of the present disclosure, while executing real time communication through the web browser, the WIC 310 receives, through the web browser, a user input indicating the change of a user interface that provides a real time communication service. In response to the user input, the WIC 310 controls the UA 340 so as to transmit a first message indicating the suspension of real time communication to the IMS through the CP. The UA 340 requests the media proxy 350 to communicate with the NIC 360, instead of the WIC 310. The UA 340 transmits a second message indicating the resumption of the real time communication to the IMS through the CP.

According to an embodiment of the present disclosure, the media proxy 350 receives first real time communication data from the CP. The media proxy 350 transmits the first real time communication data to the WIC 310. While outputting the first real time communication data through the web browser, the WIC 310 receives, through the web browser, a user input indicating the change of a user interface that provides a real time communication service. The media proxy 350 receives second real time communication data from the CP. In response to the user input, the media proxy 350 transmits the second real time communication data to the NIC 360, which outputs the second real time communication data through the phone application.

According to an embodiment of the present disclosure, the media proxy 350 receives first real time communication data from the CP, and transmits the first real time communication data to the WIC 310. While outputting the first real time communication data through the web browser, the WIC 310 receives, through a web browser, a user input indicating the change of a user interface that provides a real time communication service. In response to the user input, the UA 340 transmits a first message indicating the suspension of real time communication to the IMS through the CP. The UA 340 requests the media proxy 350 to transmit real time communication data to the NIC 360, and transmits a second message indicating the resumption of the real time communication to the IMS through the CP. The media proxy 350 receives second real time communication data from the CP, and transmits the second real time communication data to the NIC 360, which outputs the second real time communication data through the phone application.

Figure 4:
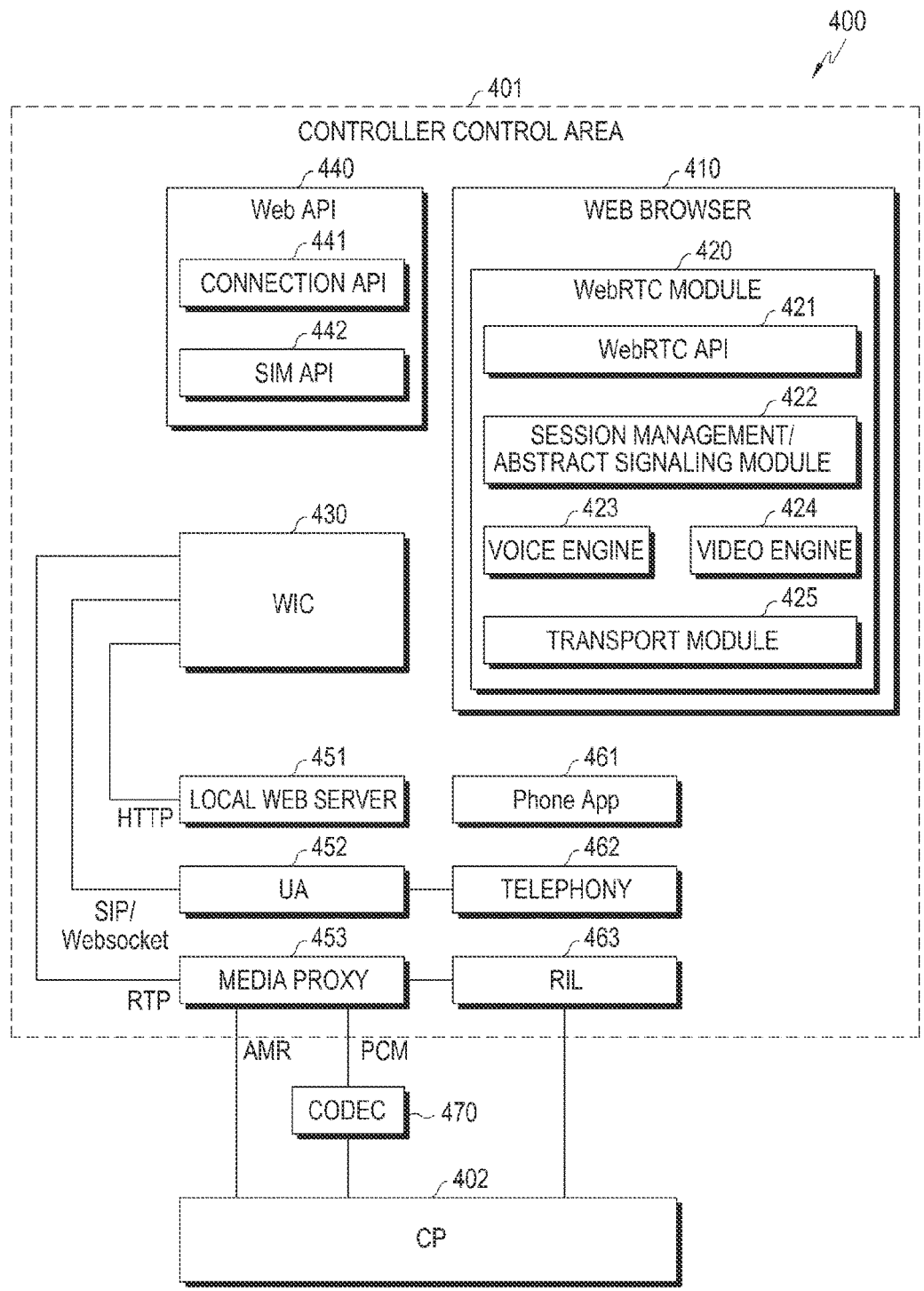
FIG. 4 illustrates a module system of an electronic device according to embodiments of the present disclosure.

FIG. 4 illustrates a module system of an electronic device according to embodiments of the present disclosure.

Referring to FIG. 4, a part of the module system 400 may be included in an area 401 controlled by a controller. The controller corresponds to an AP, or includes the AP as a part of the controller. A part of the module system 400 may be controlled by a CP.

The controller control area 401 includes at least one of a web browser 410, a WebRTC module 420, a WIC 430, a web API 440, a local web server 451, a UA 452, a media proxy 453, a phone application 461, a telephony module 462, and an RIL 463.

The module system 400 includes the modules in the controller control area 401, a codec 470, and a CP 402. The codec 470 may be included in the CP 402, or may be included in the controller control area 401.

The web browser 410 includes a WebRTC module 420, which includes a plurality of components/engines/layers/sub-modules. The WebRTC module 420 includes a WebRTC API 421, a first session management/abstract signaling module 422, a voice engine 423, a video engine 424, and a transport module 425.

The web browser 410 reproduces, displays, and/or searches for information resources on the web. The web browser 410 includes and/or controls the WebRTC module 420. The web browser 410 may be referred to as a browser application or a web browser application.

The WebRTC module 420 provides functions for providing a WebRTC service, and includes and/or controls the WebRTC API 421, the session management/abstract signaling module 422, the voice engine 423, the video engine 424, and the transport module 425.

The WebRTC API 421 is an interface through which the WIC 430 controls functions provided by the WebRTC module 420, and includes at least one interface or instruction for at least one of file control, window control, image processing, and text control.

The session management/abstract signaling module 422 performs a session related function such as the generation, connection, or management of a session. The session may be provided for semi-permanent interactive information interchange between the electronic device and a partner device, and each of the electronic device and the partner device stores session information associated with the history of the session for communication. The session information includes at least one of a unique session identifier and user preferences. The abstract signaling refers to transmission or reception of session information, and the session information in the abstract signaling includes at least one of a supported format, a target of transmission, and connection/network information.

The voice engine 423 executes a function as a framework for the transmission of audio media to a network from an audio module such as a sound card, in the electronic device.

The voice engine 423 includes and controls at least one of an iSAC/iLBC/Opus codec, a voice NetEQ buffer, an EC/NR module, and an audio capture/render module, for example.

The iSAC/iLBC/Opus codec includes an Internet speech audio codec (iSAC), an Internet low bitrate codec (iLBC), and an opus codec. The iSAC codec is a wideband or ultra-wideband codec for voice over Internet protocol (VoIP) and streaming audio, provides a bitrate of 12 to 52 kbps, and uses a sampling frequency of 16 kHz or 32 kHz. The iLBC codec is a narrowband codec for a VoIP and streaming audio signal, provides a bitrate of 15.2 kbps or 13.33 kbps, and uses a sampling frequency of 8 kHz. The Opus codec supports a fixed or variable bitrate encoding of 6 kbps to 510 kbps, and uses a sampling frequency of 8 kHz to 48 kHz.

The voice network equalization (NetEQ) buffer is an audio jigger buffer or dynamic jitter buffer, and supports an error concealment algorithm for correcting a network jitter and a packet loss.

The echo cancellation/noise reduction (EC/NR) module is a signal processing component based on software, and removes the sound echo of a voice input into a microphone in real time. The EC/NR module removes particular types of background noise.

The audio capture/renderer module performs a function of receiving a voice using the microphone or outputting a voice using a speaker.

The video engine 424 performs a function as a framework for video media transport from a camera to a network, or from a network to a display. The video engine 424 includes and controls at least one of a VP8 codec, a video jitter buffer, an image enhancement module, and a video capture module, for example.

The VP8 codec executes encoding or decoding an input video.

The video jitter buffer performs a function of correcting a jitter effect and/or data loss during transmission/reception.

The image enhancement module executes a function of removing noise included in a video captured by a camera.

The video capture module executes a function of capturing a video using the camera.

The transport module 425 executes a function of communicating with a network, and is a layer that provides a point-to-point or host-to-host communication service for applications in a hierarchical structure of network components and protocols. The transport module 425 includes and/or controls at least one of a secure RTP (SRTP) module, a multiplexing module, a point-to-point (P2P) Session Traversal Utilities for Network Address Translation (NAT) (STUN), Traversal Using Relay NAT (TURN), or Interactive Connectivity Establishment (ICE) (STUN/TURN/ICE) module, and a network input/output (I/O) module, for example.

The SRTP module executes a function of providing communication using RTP and a function of providing communication using an SRTP that encodes data, authenticates a message, and provides integrity.

The multiplexing module collects data for configuring a message, and generates a message by assembling the collected data and a header.

The P2P STUN/TURN/ICE module establishes a communication connection between the electronic device and an external device using STUN/TURN/ICE.

The network I/O module executes a function of processing the data/message/packet/frame, which is output to a network, and the data/message/packet/frame, which is input from the network.

The WIC 430 is a web-based application that provides a WebRTC service, and provides real time communication services, such as a voice call, a video chat, or file transmission using or controlling the web browser 410 and/or the WebRTC module 420. The WIC 430 may be integrated into the web browser 410.

The web API 440 includes APIs used when the WIC 430 controls the telephony module 462 through the web browser 410, and the web API 440 includes a connection API 441 for a PDN connection or a web socket connection, and a SIM API 442 for obtaining information from a SIM.

For example, the connection API 441 includes first and second APIs and the SIM API 442 includes third to fifth APIs. The connection API 441 further includes a sixth API.

According to an embodiment of the present disclosure, the sixth API may be included in the web browser 410, which receives a request for using the sixth API from the WIC 430 and displays a query associated with the use of the sixth API, or displays a screen part/area that includes the query. The web browser 410 receives a user input associated with the use of the sixth API, and may or may not execute an operation using the sixth API in response to the user input, such as grant or refusal.

For example, the sixth API may be defined as a function or an instruction named "navigator.connection.stopUsingNetworkFeature( )" the web browser 410 receives information associated with a type of PDN from the WIC 430 that uses the sixth API, as a parameter of the function or the instruction, and the web browser 410 requests the telephony module 462 to terminate the corresponding PDN connection.

The local web server 451 provides loading data for loading the WIC 310. The local web server 451 and the WIC 310 execute communication using hyper text transport protocol (HTTP). The local web server 451 includes a web application for the communication with the UA 452.

The UA 452 is configured to communicate with each of the WIC 430, the telephony module 462, the media proxy 453, and the CP 402, and controls the telephony module 462 for the connection/release of a call through the 3GPP/3GPP2 CS network, controls the media proxy 453 for connecting a call through a PDN and the 3GPP/3GPP2 CS network, and controls the CP 402 for transmitting a registration message. The UA 452 and the WIC 430 execute communication using a session initiation protocol (SIP) or a web socket. The UA 452 interprets an SIP packet received from the WIC 430 or a signaling packet of other schemes, calls an appropriate telephony API, transfers an event from the telephony module 462 to the WIC 430 through a SIP/web socket, and enables a call to be smoothly established/released.

The media proxy 453 is configured to communicate with each of the WIC 430 and the CP 402. The media proxy 453 executes a function of changing the format of the communication data. The media proxy 453 and the web browser 410 execute communication using an RTP. The media proxy 453 and the CP 402 execute communication of adaptive multi-rate (AMR) or pulse-code modulation (PCM) data. The media proxy 453 extracts media data from an RTP packet received from the web browser 410, transfers the media data to the codec 470 and/or the CP 402, processes the received media data into an RTP packet and transfers the RTP packet to the web browser 410.

The phone application 461 is provided to the electronic device, and executes such functions as providing a voice call and a video call. The phone application 461 provides an application screen, and receives a communication-related input from a user using the application screen.

The telephone module 462 generates a message associated with a user input. The message has a configuration or a format, type, or protocol which may be interpreted by the CP 402, and the configuration may be, for example, an attention command (AC), inter-process communication (IPC), a Qualcomm mobile station modem (MSM) interface (QMI), or an SIP. The message includes identification information of a partner device or receiver information such as a phone number).

The RIL 463 provides an interface between the telephony module 461 and the CP 402. The RIL 463 includes an RIL driver, which processes a call-related instruction and event, and an RIL proxy that processes or manages a request of the telephony module 461 with respect to the RIL driver.

The codec 470 may be included in the CP 402, and executes the conversion between PCM data and AMR data.

The CP 402 transmits or receives data, signals, or messages through a network, and establishes a call connection, for example.

Figure 5:
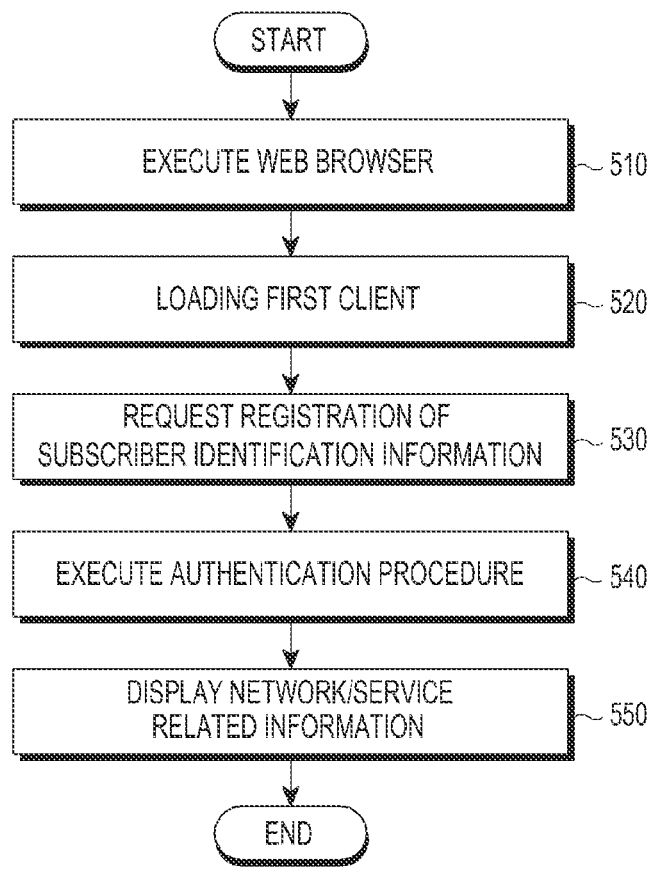
FIG. 5 illustrates a communication method of an electronic device according to embodiments of the present disclosure.

FIG. 5 illustrates a communication method of an electronic device according to embodiments of the present disclosure. FIGS. 6A, 6B, 7A and 7B illustrate a communication method of an electronic device. In step 510, a controller of an electronic device executes a web browser based on a user input or automatic settings. The user input may be a hovering gesture of a user, a touch gesture, a line of vision of the user, a motion gesture of the user, or a voice command, for example.

According to an embodiment of the present disclosure, the web browser is executed in response to the user selection or based on automatic settings, and a screen of the web browser is displayed on a display that is functionally connected to the electronic device. The screen of the application, such as a web browser, may be referred to as a GUI, an application screen, or an application window, for example. The web browser is a default application that is installed in an electronic device by the manufacturer of the electronic device, or is installed by a user. The screen corresponds to an image shown through the display when the application is executed.

Alternatively, when the web browser is executed and the web browser screen is displayed, a menu or item of the web browser is selected by a user or text may be input, and a screen providing a WebRTC service is displayed on the display that is functionally connected with the electronic device in response to the selection of the menu or item or the text input.

According to an embodiment of the present disclosure, a web application is executed in response to a user selection or is executed based on automatic settings, the web browser is automatically executed by a control of the web application, and a screen that provides a WebRTC service is displayed on the display.

Alternatively, when the web application is executed, a menu or an item of the web application is selected by the user or text is input, the web browser is executed in response to the selection of the menu or item, or the text input, and a screen that provides a WebRTC service is displayed on the display.

When the web application is executed by a user input, the user input is received through an input/output interface, a sensor module, a communication interface, or a display. A user selects a button, an icon, or a menu item through an input/output interface or a display, inputs text through the input/output interface or the display, inputs a voice command through a microphone of the input/output interface, executes a gesture or motion input through a camera of a sensor module, or wirelessly inputs an execution instruction of a predetermined application through a communication interface.

The gesture or the motion input refers to when the user draws a preset pattern, such as a linear shape, a circle, a polygon (triangle or quadrangle), or a zigzag in the air within a viewing angle of the camera module or a sensing range of the sensor module by using a hand or a finger. In this instance, the gesture is referred to as a spatial gesture, in distinction from a touch gesture. The touch gesture includes a direct touch or a hovering on the display.

A touch/hovering gesture using a user input unit such as a user's finger or a pen includes at least one of a touch, a long touch, a tap, a double-tap, a flick, dragging or touch & move, drag & drop, a swipe, a multi-swipe, a pinch, a shake, and a rotation, which are distinguished based on an input method. A touch involves placing a user input unit on the display, a long touch (or touch & hold) involves lengthily touching the display, a tap involves quickly and lightly touching the display, a double tap involves quickly touching the display two times, a flick or scroll involves placing a user input unit on the display and quickly moving and then removing the user input unit, a drag involves moving or scrolling an item displayed on the display, a drag & drop involves moving an item while touching the display and then removing the touch from the display while the movement stops, a swipe involves moving over a predetermined distance while touching the display with a user input unit, a multi-swipe involves moving over a predetermined distance while touching the display with at least two user input units, and a pinch involves moving in different directions while touching the display with at least two user input units.

Referring to FIG. 6A, a home screen 607 is displayed on a display 605 of an electronic device 600, and an item 610 of a web application and an item 620 of a web browser each for executing or logging in the WebRTC service are displayed on the home screen 607.

Referring to FIG. 6B, a user input 630 for selecting the item 610 of the web application is received, and the web application is executed in response to the user input 630. As the web application is executed, a screen of the web application is displayed or a screen of the web browser related to the web application is displayed. The web application may be executed as a background.

Referring back to FIG. 5, in step 520, the controller detects a user input through the web browser or the web application, accesses a web server, a WebRTC Web Server Function (WWSF) or a website that provides a WebRTC connection through the web browser and a communication module, in response to the user input, and receives loading data for loading a WIC from the web server. The controller loads the WIC into the electronic device using the loading data. For example, the web browser receives, from the web server, a webpage including a WIC that is written in Javascript, and the web browser executes the Javascript.

The WIC is loaded so as to interwork with the web browser, or is loaded independently from the web browser. The WIC is controlled by the controller, or forms a part of the controller. According to an embodiment of the present disclosure, step 520 may be executed before step 510. According to an embodiment of the present disclosure, the WIC may be integrated into the web browser, and the functions of the WIC may be executed by the web browser.

Referring back to FIG. 5, in step 530, the controller requests registering subscriber identification information in an IMS or a device or a server in the IMS such as the S-CSCF, for providing WebRTC through the IMS/PDN. The controller is configured to establish a communication connection between the electronic device and the PDN or a device or a server in the PDN such as the S-CSCF through the CP. The communication connection includes a web socket connection, and the communication between the electronic device and the PDN or a device or a server in the PDN such as the S-CSCF is executed using a web socket.

According to an embodiment of the present disclosure, the controller requests a communication connection with the PDN from the CP by using a first API of the web browser, and receives information associated with the communication connection or information associated with a device or a server in the PDN from the CP.

According to an embodiment of the present disclosure, the controller displays a query associated with the use of the first API or the use of an IMS/PDN or LTE, or displays a screen part/area including the query on a display or a screen of the web browser. The controller receives a user input associated with the use of the first API, and may or may not execute an operation using the first API in response to the user input, such as grant or refusal. When an input indicating grant is received from the user, the controller requests a communication connection between the electronic device and the PDN from the CP.

According to an embodiment of the present disclosure, the controller displays information associated with a network such as the IMS, the PDN, or the 3GPP/3GPP2 CS network, in the web browser, another application, or a screen part/area such as a message or a window.

Referring to FIG. 7A, a screen 710 that provides a WebRTC service, which corresponds to a screen of the web browser, on a display 705 of an electronic device 700, and network information 730 and/or a plurality of items 721 to 724 corresponding to various functions of the WebRTC service is displayed in at least a part of the display 705.

For example, the controller periodically/aperiodically receives information associated with a currently connected network, such as MCC, MNC, RAT, or RSSI, and/or characteristic information such as QoS or security level of a currently used channel, from the CP and/or another communication module, or the controller may receive the information by sending a request to the CP and/or the other communication module. For example, the controller displays that a call through the IMS/PDN, LTE, 3GPP/3GPP2 CS network or through WiFi is currently executed, displays that a call is executed through a secure channel, displays that the network is switched between LTE and WiFi, and displays that LTE and WiFi are simultaneously used.

The plurality of items includes at least one of a first item A-1 721 for a voice call, a second item A-2 722 for a video chat, a video call, or a video conference, a third item A-3 723 for transferring a file, and a fourth item A-4 724 for switching networks. A user input for selecting one of the items is received, in response to which a function (or sub-services) of the WebRTC service corresponding to the selected item are executed.

Referring to FIG. 7B, a screen part/area 740 such as a query window is displayed on the display 705 of the electronic device 700. The screen part/area 740 is displayed to overlap or to not overlap a screen 710 that provides a WebRTC service.

The screen part/area 740 displays queries such as, "will you use a service through an operator network in a web browser?", "will you grant a request for using an API?", "will you allow a connection of . . . ?", or "will you allow a switch to . . . ?", and includes a confirm button 742 to allow the content of a query and a cancellation button 744 to cancel or refuse the content of the query, and determines whether a predetermined PDN or API associated with an operator network is used.

According to an embodiment of the present disclosure, the controller is configured to obtain subscriber identification information stored in a SIM of the electronic device using the CP, and to transmit a registration message including the subscriber identification information to the IMS or the S-CSCF. According to an embodiment of the present disclosure, the controller may directly obtain the subscriber identification information stored in the SIM of the electronic device without using the CP.

The subscriber identification information includes at least one of an IP Multimedia Private Identity (IMPI) and an IP Multimedia Public Identity (IMPU).

The SIM or the subscriber identification information includes, in addition to the IMPI and the IMPU, at least one of a unique identifier such as an integrated circuit card identifier (ICCID) of the SIM, a unique identifier of a subscriber such as an international mobile subscriber identity (IMSI), security authentication and/or encryption information, temporary information associated with a network, a list of services that a user accesses, a personal identification number (PIN), and a personal unblocking code (PUC) (or a PIN unlock key (PUK)) for unlocking a PIN. The security authentication and/or encryption information includes at least one of a user specific secret key (K), certain message authentication functions (f1 and f2), certain key generating functions (f3, f4, and f5), a sequence number (SQN), a random value or a random challenge value such as RAND or Nonce, an authentication token (AUTN), an authentication response value such as RES, SRES, or AKA authentication response value, a cipher key (CK or KC), and an integrity key (IK).

According to an embodiment of the present disclosure, the controller requests first subscriber identification information such as the IMPU from the CP using a third API. In response to the request of the controller, the CP obtains the first subscriber identification information stored in the SIM. The controller receives the first subscriber identification information from the CP.

According to an embodiment of the present disclosure, as illustrated in FIG. 7B, the controller displays a query associated with the use of the third API (or use of subscriber identification information or registration of subscriber/device/subscriber identification information) or displays a screen part/area that includes the query, on the display or a screen of the web browser.

According to an embodiment of the present disclosure, the controller requests second subscriber identification information such as the IMPI from the CP using a fourth API. In response to the request of the controller, the CP obtains the second subscriber identification information stored in the SIM. The controller receives the second subscriber identification information from the CP.

According to an embodiment of the present disclosure, as illustrated in FIG. 7B, the controller displays a query associated with the use of the fourth API or displays a screen part/area that includes the query, on the display or the screen of the web browser.

According to an embodiment of the present disclosure, the controller generates a registration message containing subscriber identification information, and transmits the registration message to the IMS or the eP-CSCF through the CP. The eP-CSCF transmits the registration message to the S-CSCF.

Referring back to FIG. 5, in step 540, the controller executes an authentication procedure in response to the request for registration. The controller is configured to receive a first message or an authentication request message including a first value from the IMS through the CP, and to transmit, to the IMS through the CP, a second message or an authentication response message including a second value generated based on the first value.

According to an embodiment of the present disclosure, the controller receives a first message including a first value (or authentication information) for authentication, from the IMS or eP-CSCF through the CP. The controller requests, from the CP, a second value (or a response value to the first value) generated based on the first value. In response to the request of the controller, the CP transfers the first value to the SIM, and obtains the second value from the SIM, receives the second value from the CP, generates a second message including the second value, and transmits the second message to the IMS or eP-CSCF through the CP. The controller receives a third message indicating whether the authentication is successfully executed, from the IMS or eP-CSCF through the CP.

According to an embodiment of the present disclosure, the authentication information transmitted from the IMS includes random (RAND) and authentication (AUTN). AUTN may be formed of sequence number (SQN), an authentication management field (AMF), and a message authentication code (MAC). The SIM determines whether AUTN is allowable, and when it is allowable, the SIM generates response (RES) information. The IMS compares XRES generated by the IMS and the received RES. When the XRES and the RES are identical, it is determined that the authentication is successfully executed.

According to an embodiment of the present disclosure, the authentication information transmitted from the IMS includes RAND or NONCE. The SIM generates SRES, which is response information, by substituting RAND (or NONCE) and K, which is a user specific secret key, in A3, which is a predetermined function. The IMS compares an SRES generated by the IMS and the received SRES, and when these SRES values are identical, it is determined that the authentication is successfully executed.

In step 550, the controller displays, in a part of the web browser, at least one of information associated with a network to which the electronic device is connected, characteristic information of a channel that the electronic device currently uses, and information associated with a currently used service. For example, at least one of the information associated with the service and the information associated with the network to which the electronic device is connected includes at least one of a notification indicating that a VoLTE call is currently executed, a notification indicating that packet communication through an IMS PDN is currently executed, a notification indicating that a call is executed through a secure channel, a notification that indicates switching between LTE and WiFi, and a notification indicating that LTE and WiFi are simultaneously used.

Figure 8A:
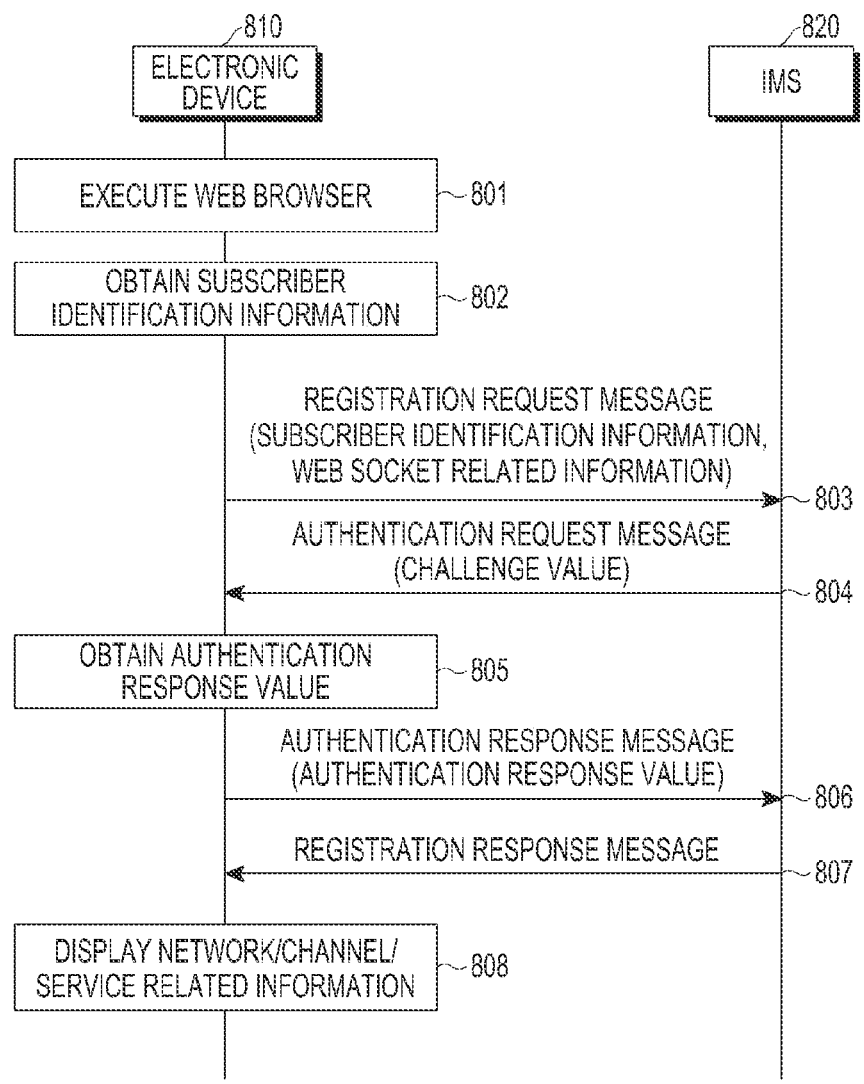
FIGS. 8A and 8B illustrate a communication method of an electronic device according to embodiments of the present disclosure.

FIG. 8A illustrates a communication method of an electronic device according to embodiments of the present disclosure. In step 801, an electronic device 810 executes a web browser based on a user input or automatic settings. The user input includes, for example, a hovering gesture, a touch gesture, a line of vision, a motion gesture, or a voice command, of the user.

In step 802, the electronic device 810 obtains subscriber identification information stored in a SIM using at least one API. For example, the at least one API includes a third API such as navigator.telephony.getIsimImpu( ) or a fourth API such as navigator.telephony.getIsimImpi( ).

In step 803, the electronic device 810 transmits, to an IMS 820, a registration request message for registration of the electronic device 810. The registration request message includes the subscriber identification information and web socket or WebRTC associated information.

In step 804, the electronic device 810 receives, from the IMS 820, an authentication request message for the authentication of the electronic device 810. The authentication request message includes a challenge value such as RAND or Nonce.

In step 805, the electronic device 810 obtains an authentication response value using the challenge value and a fifth API such as navigator.telephony.requestIsimAuthentication ( ). The authentication response value is obtained from the SIM or from authentication related information stored in the SIM.

In step 806, the electronic device 810 transmits an authentication response message containing the authentication response value to the IMS 820.

In step 807, the electronic device 810 receives, from the IMS 820, a registration response message that includes a response value, such as the success or failure of the registration/authentication, in response to the request for registration. The IMS 820 compares a value that is generated based on the challenge value with the authentication response value, and when these values are identical, the IMS 820 determines that the authentication is successfully executed. When these compared values are different from each other, the IMS 820 determines that the authentication fails.

In step 808, the electronic device 810 provides a WebRTC service through an IMS PDN when the authentication is successfully executed, and the electronic device 810 displays, in a part of the web browser, at least one of information associated with a network such as an IMS PDN to which the electronic device is connected, characteristic information (for example, QoS, security level, or the like) of a channel that the electronic device currently uses, and information associated with a currently used service. At least one of the information associated with the service and the information associated with the network to which the electronic device is connected includes at least one of a notification indicating that a VoLTE call is currently executed, that packet communication through an IMS PDN is currently executed, that a call is executed through a secure channel, that a switch between LTE and WiFi is performed, and that LTE and WiFi are simultaneously used.

Figure 8B:
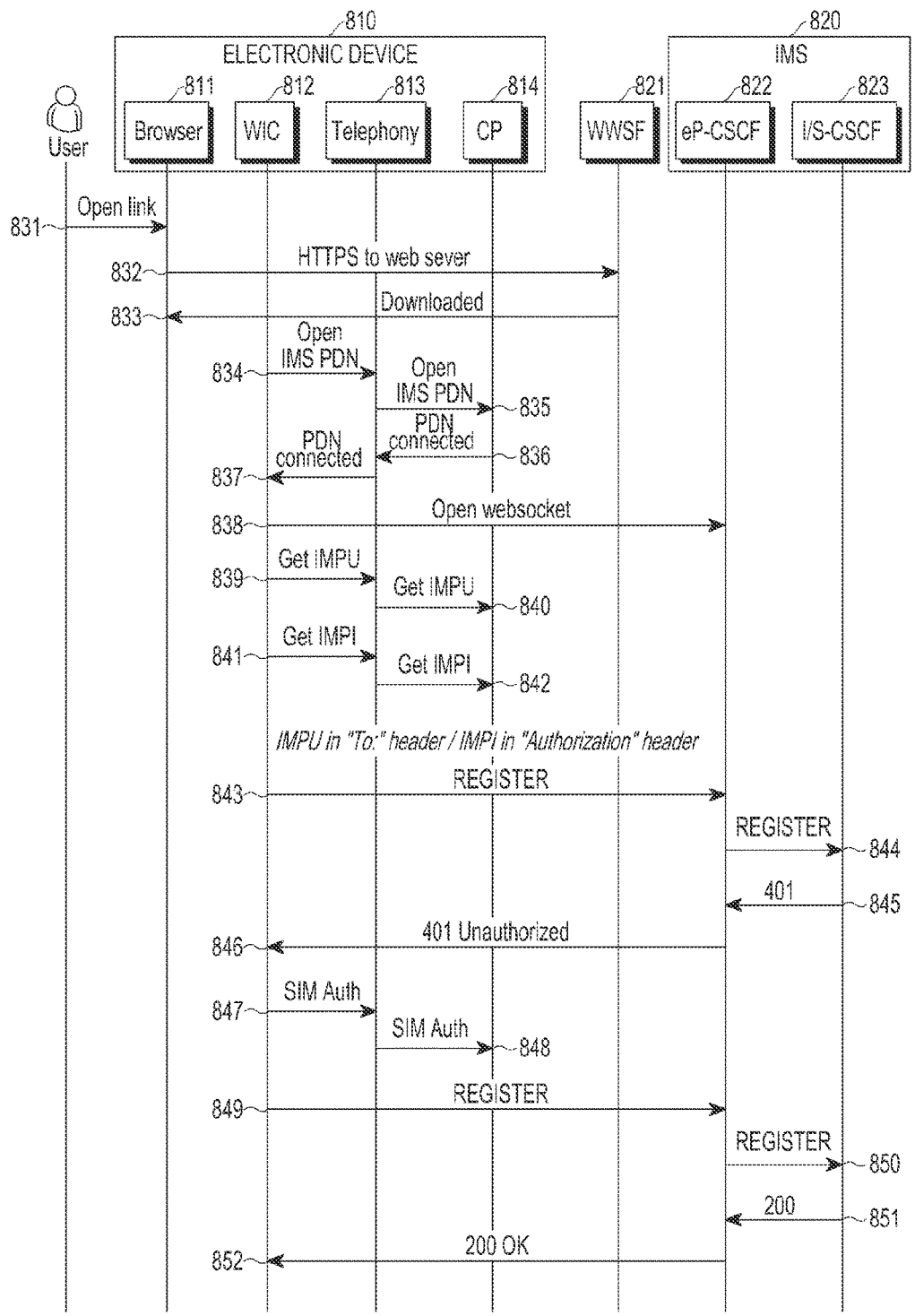

FIG. 8B illustrates a communication method of an electronic device according to embodiments of the present disclosure.

In step 831, a web browser 811 opens/connects a link of a website that provides a WebRTC connection, in response to a user input.

In step 832, the web browser 811 transmits, to a WebRTC Web Server Function (WWSF) 821, a request for downloading a WIC 812 or a webpage including a WIC. According to an embodiment of the present disclosure, the WIC 812 or the webpage including the WIC is automatically downloaded when a website is open.

In step 833, the WWSF 821 transmits, to the web browser 811, loading data for loading the WIC 812. For example, the web browser 811 receives, from the WWSF 821, a webpage including a WIC that is written in Javascript, and the web browser 811 executes the Javascript. According to an embodiment of the present disclosure, steps 832 and 833 may be omitted, and the electronic device 810 may load a previously stored WIC or execute a web browser to which a WIC is integrated.

In step 834, the WIC 812 requests a telephony module 813 to open, i.e., connect an IMS PDN, using a first API, so as to transmit an SIP message through the IMS PDN. To use the first API, the web browser 811 needs to ask a user to allow the use of the first API for security purposes, and the operations associated with the first API may be executed only when the user allows the use.

For example, the first API is defined as a function or an instruction named "navigator.connection.startUsingNetworkFeature( )" the web browser 811 receives a type of PDN from the WIC 812 that uses the first API, as a parameter of the function or the instruction, and the web browser 811 requests the telephony module 813 to open a corresponding PDN.

In step 835, the telephony module 813 requests the CP 814 to open an IMS PDN.

In step 836, the CP 814 connects to the IMS PDN, and transmits connection information to the telephony module 813.

In step 837, the telephony module 813 transmits the IMS PDN connection information to the WIC 812. According to an embodiment of the present disclosure, the telephony module 813 transmits the IMS PDN connection information to the web browser 811, and the web browser 811 transmits the connection information to the WIC 812.

In step 838, the WIC 812 requests a web socket connection from an eP-CSCF 822. The communication described below may use the IMS PDN connected in step 837. The WIC 812 requests a web socket connection using a second API. To use the second API, the web browser 811 needs to ask a user to allow the use of the second API for security purposes, and the operations associated with the second API may be executed only when the user allows the use.

For example, the second API is defined as a function or an instruction named "navigator.connection.requestRouteToHost( )," the web browser 811 receives a type of PDN and server or device information from the WIC 812 that uses the second API, as a parameter of the function or the instruction, and the web browser 811 requests the telephony module 813 to transmit a packet that is transferred to a corresponding server by using a corresponding PDN that supports a web socket connection.

According to an embodiment of the present disclosure, steps 834 to 838 may be executed after the registration is completed in steps 841 and 842, or may be executed at another point in time.

In step 839, the WIC 812 obtains SIM information for preparing the content of a registration (REGISTER) message, by requesting an IMPU from the telephony module 813 using a third API. To use the third API, the web browser 811 needs to ask a user to allow the use of the third API for security purposes, and the operations associated with the third API may be executed only when the user allows the use.

For example, the third API is defined as a function or an instruction named "navigator.telephony.getIsimImpu( )", and the web browser 811 requests an IMPU from the telephony module 813. One or more IMPUs may be received in response to the request. When one or more IMPUs are available, one of the IMPUs may be selected and used based on the embodiment of the WIC.

In step 840, the telephony module 813 requests the CP 814 to obtain an IMPU through the SIM. When the CP 814 obtains the IMPU, the IMPU may be transferred to the WIC 812 through the telephony module 813 and the web browser 811.

In step 841, the WIC 812 requests an IMPI from the telephony module 813 using a fourth API. To use the fourth API, the web browser 811 needs to ask a user to allow the use of the fourth API for security purposes, and the operations associated with the fourth API may be executed only when the user allows the use.

For example, the fourth API is defined as a function or an instruction named "navigator.telephony.getIsimImpi( )", and the web browser 811 requests an IMPI from the telephony module 813.

In step 842, the telephony module 813 requests the CP 814 to obtain an IMPI through the SIM. When the CP 814 obtains the IMPI, the IMPI is transferred to the WIC 812 through the telephony module 813 and the web browser 811 (not shown).

In step 843, the WIC 812 transmits, to the eP-CSCF 822, an SIP registration message through the web socket connection.

An example of a registration message that uses a Digest type authentication scheme is described in Table 1, as follows.

TABLE 1

REGISTER sip:10.253.75.165 SIP/2.0
Via: SIP/2.0/WSS jtvg1b7qksgc.invalid;branch=z9bG4bK5011255
Max-Forwards: 70
To: <sip:88889@10.253.75.165[1]>
From: "88889" <sip:88889@10.253.75.165>;tag=b3il29l3e7
Call-ID: m32c31p63uc59a6vl7o21i
CSeq: 83 REGISTER
Authorization: Digest algorithm=MD5, username="88889[2]",
realm="10.253.75.165[3]",
nonce="VBqRT1QakCNRNuqeYsCw2XEYW0uWOxUXB8uiMoA=",
uri="sip:10.253.75.165",
response="9be1e1bfee8834ee85b7d9a400453d7b"
   Contact: <sip:1f94417k@jtvg1b7qksgc.invalid;transport=ws[4]>;reg-id=1;+sip.instance="<urn:uuid:f8f026fa-e204-4162-afe8-83b51ed7ced1>[5]";expires=600
   Allow:
ACK,CANCEL,BYE,OPTIONS,INFO,NOTIFY,INVITE,MESSAGE
   Supported: path,gruu,outbound
   User-Agent: secwebrtc/0.0.1 (SIP.js/0.6.0)
   Content-Length: 0

The registration message requests a process of registering a URI and contact address of the electronic device 810 in the IMS 820, so as to enable the data/message/packet/request that is received in the corresponding URI after the registration, to be routed to the corresponding electronic device.

(1) The "To" field of the registration message includes a receiver of an SIP message. The electronic device 810 designates a desired URI to the "To" field. The electronic device 810 that supports the IMS obtains an IMPU value of the SIM and designates the IMPU value to the "To" field.

(2) The "Authorization" field informs the IMS 820 of the Credential of the electronic device 810, and is used for authentication of the electronic device 810. "username" of the Authorization field corresponds to User such as "88889" of the IMPI value such as "88889@10.253.75.165" of the SIM.

(3) "realm" of the Authorization field corresponds to Domain ("10.253.75.165") of the IMPI value such as "88889@10.253.75.165") of the SIM.

(4) When a web socket is used, "transport=ws" may be designated to a URL parameter of Contact, based on RFC7118. For example, the registration message includes identification information indicating that the web socket is used, and thus, the IMS 820 recognizes that the registration message is for providing a WebRTC service through an IMS PDN. According to an embodiment of the present disclosure, the registration message includes identification information for identifying a WebRTC service, the web browser 811, or the WIC 812.

(5) The "Contact" field includes an address which enables the IMS 820 to directly access the electronic device 810. When the WIC 812 is not able to directly obtain the IP address of the electronic device 810, a virtual address in the form of ".invalid" is used, as shown. "+sip.instance" includes a universally unique identifier (UUID) based on RFC4122. The UUID is generated in various methods depending on RFC4122, and in the present example, the UUID is randomly generated. The IMS 820 that receives the registration message including "+sip.instance" transmits, to the electronic device 810, a globally routable user agent URI (GRUU), which can specify an electronic device to which an SIP packet is directly transmitted, unlike a general URI that is not capable of specifying an electronic device to which an SIP packet is directly transmitted.

In step 844, the eP-CSCF 822 transmits the registration message to an I/S-CSCF 823.

In step 845, the I/S-CSCF 823 transmits, to the eP-CSCF 822, a response message such as 401 Unauthorized, in response to the registration message.

In step 846, the eP-CSCF 822 transmits the response message to the electronic device 810 for requesting AKA authentication.

In steps 847 and 848, the WIC 812 transfers an SIM authentication value (SIM Auth) such as a Nonce value included in the response message to the SIM through the telephony module 813 to obtain a response value to perform the AKA authentication procedure. In step 848, the WIC 812 requests an AKA authentication response value from the telephony module 813 using a fifth API. To use the fifth API, the web browser 811 needs to ask a user to allow the use of the fifth API for security purposes, and the operations associated with the fifth API may be executed only when the user allows the use.

For example, the fifth API is defined as a function or an instruction named "navigator.telephony.requestIsimAuthentication( )," the web browser 811 receives a Nonce value from the WIC 812 that uses the fourth API, as a parameter of the function or the instruction, and the web browser 811 requests the AKA authentication response value from the telephony module 813.

In step 848, the telephony module 813 requests the CP 814 to obtain the AKA authentication response value through the SIM. When the CP 814 obtains the AKA authentication response value, the AKA authentication response value is transferred to the WIC 812 through the telephony module 813 and the web browser 811.

In step 849, the WIC 812 transmits, to the eP-CSCF 822, an SIP registration message including the AKA authentication response through the web socket connection.

In step 850, the eP-CSCF 822 transmits the registration message to an I/S-CSCF 823.

In step 851, the I/S-CSCF 823 transmits, to the eP-CSCF 822, a response message such as 200 OK in response to the registration message.

In step 852, the eP-CSCF 822 transmits the response message such as 200 OK to the WIC 812 or the electronic device 810 to report that the registration is completed.

Figure 9:
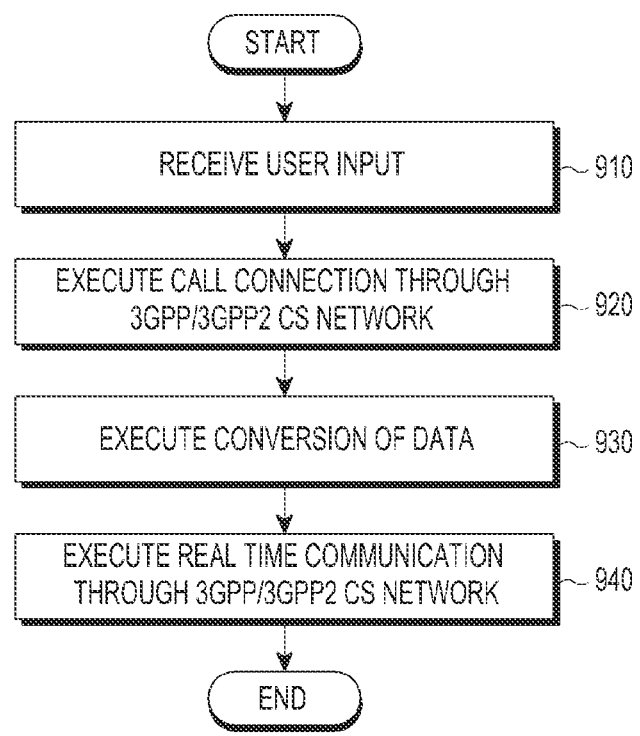
FIGS. 9, 10, 11, 12A and 12B, 13, and 14A and 14B illustrate communication methods of an electronic device according to embodiments of the present disclosure.

FIG. 9 illustrates a communication method of an electronic device according to embodiments of the present disclosure. In step 910, a controller of an electronic device detects a user input through a web browser or a web application. According to an embodiment of the present disclosure, the controller receives a user input that instructs real time communication through a 3GPP/3GPP2 CS network through a screen of the web browser that provides a WebRTC service.

In step 920, the controller establishes a call connection between the electronic device and a partner device over the 3GPP/3GPP2 CS network through the CP.

In step 930, the controller executes the conversion of data between a format supported by the web browser in association with real time communication data and a format supported by the 3GPP/3GPP2 CS network or the CP.

In step 940, the controller executes real time communication through the 3GPP/3GPP2 CS network.

For example, the controller converts the real time communication data provided in the format supported by the web browser into the real time communication data of the format supported by the 3GPP/3GPP2 CS network, and transmits the real time communication data, of which the format is converted to a partner device through the call connection, through the CP.

For example, the controller converts the real time communication data provided in the format supported by the 3GPP/3GPP2 CS network, which is received through the CP and the call connection, into the real time communication data of the format supported by the web browser, and outputs, through the web browser, the real time communication data of which the format is converted.

Figure 10:
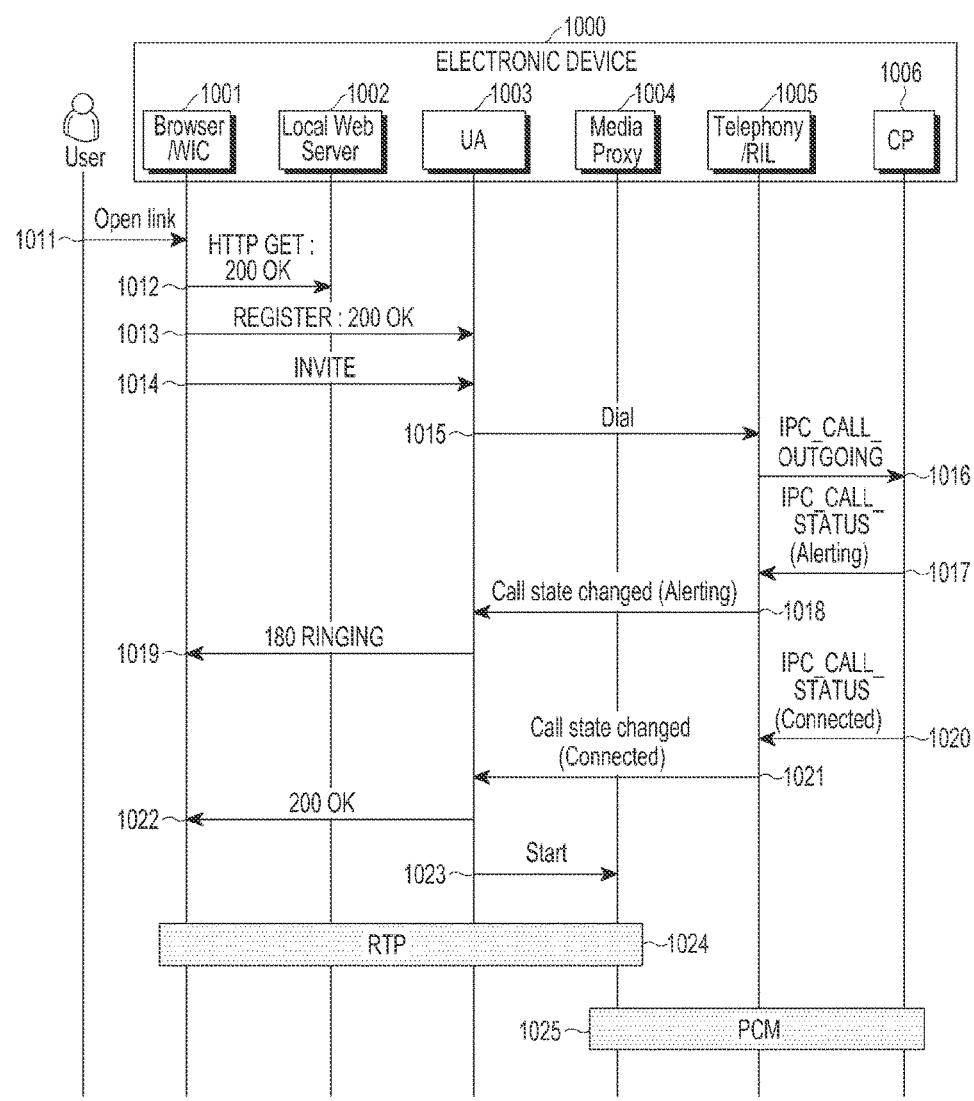

FIG. 10 illustrates a communication method of an electronic device according to embodiments of the present disclosure. In step 1011, a browser/WIC 1001 opens/connects a link of a website that provides a WebRTC connection in response to a user input. The website is for a 3GPP/3GPP2 CS call provided by a local web server 1002 of an electronic device 1000. The browser/WIC 1001 indicates a web browser and/or a WIC.

In step 1012, the browser/WIC 1001 transmits, to the local web server 1002, a request for downloading a WIC. The WIC is configured to be operated by recognizing a UA 1003 as an eP-CSCF. According to an embodiment of the present disclosure, step 1012 may be omitted, and the electronic device 1000 may load a previously stored WIC or execute a web browser to which a WIC is integrated.

In step 1013, the browser/WIC 1001 transmits a registration (REGISTER) message to the UA 1003. The UA 1003 registers a WIC after determining whether the WIC is provided from the local web server 1002, and transmits, to the browser/WIC 1001, a response message 200 OK in response to the registration message.

In step 1014, the browser/WIC 1001 transmits an invitation (INVITE) message to the UA 1003 so as to initiate a call. The invitation (INVITE) message includes identification information such as a phone number associated with the destination of the call, and the UA 1003 determines the target of the call to be initiated based on the identification information.

In step 1015, the UA 1003 requests a telephony/RIL 1005 to initiate a call using a corresponding number. The telephony/RIL 1005 indicates a telephony module and/or an RIL.

In step 1016, the telephony/RIL 1005 requests a CP 1006 to initiate a 3GPP/3GPP2 CS call, by transmitting, to the CP 1006, an IPC_CALL_OUTGOING message, instructing the initiation of a CS call.

In step 1017, the CP 1006 receives a message containing information associated with the alerting state in which a call connection request is transmitted from a 3GPP/3GPP2 CS network to a partner device, and transmits, to the telephony/RIL 1005, an IPC_CALL_STATUS(Alerting) message containing information associated with the alerting state.

In step 1018, the telephony/RIL 1005 transmits, to the UA 1003, a Call state changed(Alerting)message containing the state information.

In step 1019, the UA 1003 transmits, to the browser/WIC 1001, a 180 RINGING message containing the state information.

In step 1020, the CP 1006 receives a message including information associated with the Connected state in which the partner device grants a call connection request, from the 3GPP/3GPP2 CS network, and transmits, to the telephony/RIL 1005, an IPC_CALL_STATUS(Connected) message that includes information associated with the state.

In step 1021, the telephony/RIL 1005 transmits, to the UA 1003, a Call state changed(Connected) message containing the state information.

In step 1022, the UA 1003 transmits, to the browser/WIC 1001, a 200 OK message containing the state information.

In step 1023, the UA 1003 transmits a start instruction to a media proxy 1004, so as to convert real time communication data such as RTP data or media from the browser/WIC 1001 into PCM data and to transmit the data to the CP 1006, or to convert the real time communication data such as PCM data received from the CP 1006 into RTP data and to transmit the PCM data to the browser/WIC 1001.

In step 1024, the communication of RTP data is executed between the browser/WIC 1001 and the media proxy 1004. In step 1025, as the communication of PCM data is executed between the media proxy 1004 and the CP 1006, real time communication between the browser/WIC 1001 and the partner device is executed through the 3GPP/3GPP2 CS network.

Figure 11:
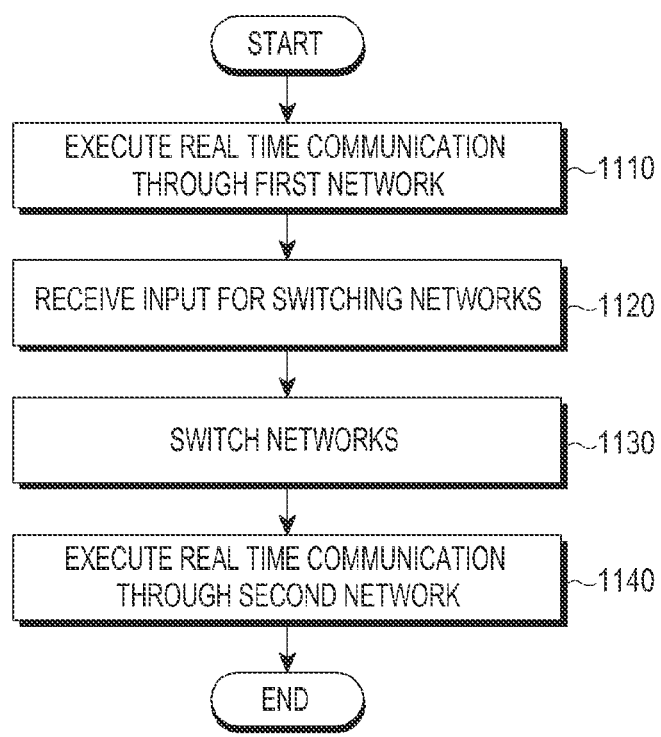

FIG. 11 illustrates a communication method of an electronic device according to embodiments of the present disclosure. The communication method may be executed by an electronic device or a controller of the electronic device.

In step 1110, the electronic device executes real time communication through a web browser and a first network. For example, the electronic device executes the real time communication over a PDN such as an IMS PDN or an Internet PDN through a screen of a web browser that provides a WebRTC service, or over the 3GPP/3GPP2 CS network through the screen.

In step 1120, the electronic device receives an input for switching networks, such as through a screen that provides a WebRTC service. According to an embodiment of the present disclosure, the electronic device receives, from the first network or a second network, a handover signal for switching networks, through a CP.

In step 1130, the electronic device executes switching networks. For example, the electronic device releases a connection with the first network and establishes a connection with the second network through the CP. For example, the electronic device enables the CP to release a connection with an IMS PDN and to establish a connection with a 3GPP/3GPP2 CS network, or enables the CP to release the connection with the 3GPP/3GPP2 CS network and to establish the connection with the IMS PDN. For example, the electronic device executes switching between two networks from among the IMS PDN, the Internet PDN, and the 3GPP/3GPP2 CS network.

In step 1140, the electronic device executes real time communication through the second network.

According to an embodiment of the present disclosure, the electronic device suspends the real time communication with the partner device over the first network, for switching networks, and resumes the real time communication with the partner device over the second network after switching the networks.

Figure 12A:
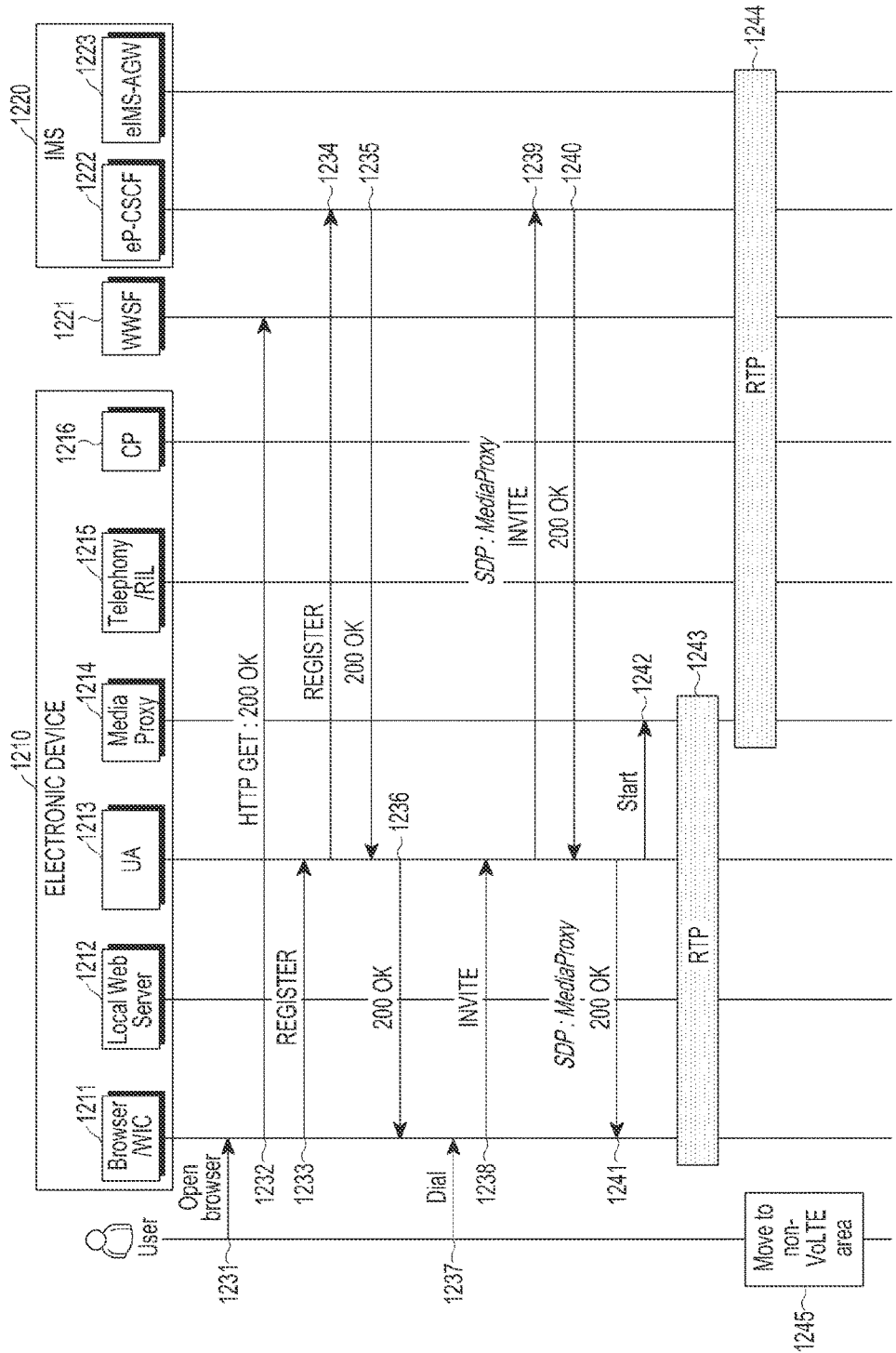
Figure 12B:
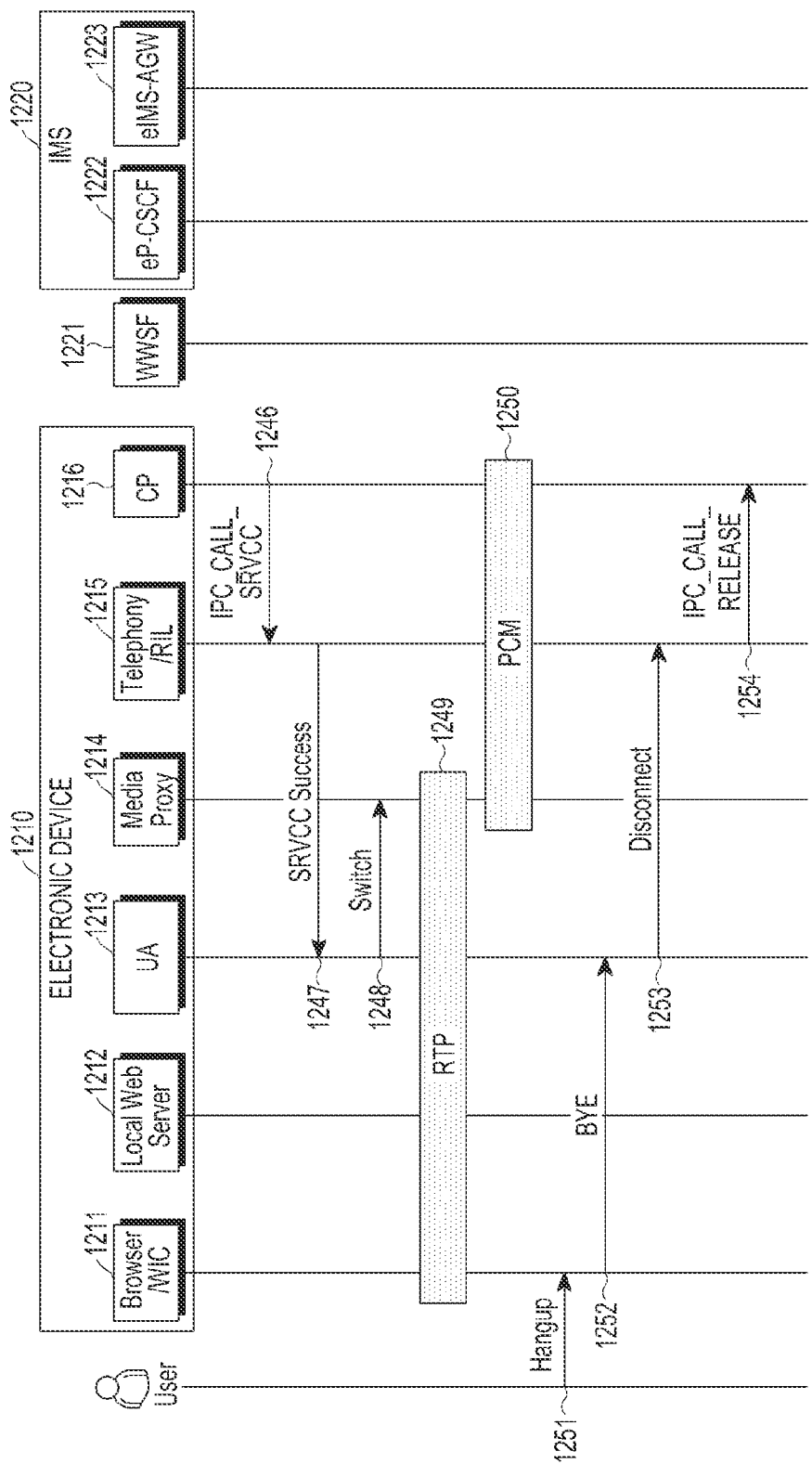

FIGS. 12A and 12B illustrate a communication method of an electronic device according to embodiments of the present disclosure.

In step 1231, a browser/WIC 1211 opens/connects a link of a website that provides a WebRTC connection in response to a user input. The browser/WIC 1211 indicates a web browser and/or a WIC. According to an embodiment of the present disclosure, the website is provided by a local web server 1212 of an electronic device 1210. The browser/WIC 1001 indicates a web browser and/or a WIC.

In step 1232, the browser/WIC 1211 transmits, to a WWSF 1221, a request for downloading a WIC. The WWSF 1221 transmits, to the browser/WIC 1211, loading data for loading the WIC, via a 200 OK message.

In step 1233, the browser/WIC 1211 transmits a registration message including subscriber identification information to a UA 1213. According to an embodiment of the present disclosure, step 1233 may be omitted, and an electronic device 1210 may load a previously stored WIC or execute a web browser to which a WIC is integrated.

In step 1234, the UA 1213 transmits the registration message to an eP-CSCF 1222 of an IMS 1220. For example, the UA 1213 determines whether to register a WIC, as in step 1013 of FIG. 10, or to execute registration through the eP-CSCF 1222, as in steps 843 to 852 of FIG. 8B. For example, the UA 1213 determines a registration scheme by considering whether the electronic device 1210 exists in an IMS available zone.

In step 1235, the eP-CSCF 1222 transmits the response message such as 200 OK to the UA 1213 or the electronic device 1210 for reporting that the registration is completed. The UA 1213 may receive the response message such as 200 OK from the eP-CSCF 1222 through the CP 1216.

In step 1236, the UA 1213 transmits, to the browser/WIC 1211, the response message such as 200 OK.

In step 1237, the browser/WIC 1211 receives a call connection request over an IMS PDN through a screen that provides a WebRTC service.

In step 1238, the browser/WIC 1211 transmits an invitation message such as an INVITE message to the UA 1213 so as to initiate a call. The INVITE message includes identification information such as a phone number associated with a destination of the call, and the UA 1213 determines the target of the call to be initiated based on the identification information.

In step 1239, the UA 1213 corrects session description protocol (SDP) data in the INVITE message by changing, into a media proxy 1214, an address to which the real time communication data or media packet is to be transmitted, and transmits the INVITE message to the eP-CSCF 1222.

The SDP is a format for describing streaming media initiation parameters or a multimedia communication session for the purpose of the notification of a session, the invitation to a session, or the negotiation of a parameter, for example. The SDP data includes information associated with a type of media such as sound, video, or data, a codec, or a bandwidth.

In step 1240, the eP-CSCF 1222 transmits a 200 OK message including information associated with the Connected state in which a partner device grants a call connection request. The UA 1213 receives the 200 OK message containing the state information through the CP 1006.

In step 1241, the UA 1213 corrects SDP data included in the 200 OK message that includes the state information by changing, into the media proxy 1214, an address to which the real time communication data or a media or RTP packet is to be transmitted, and transmits the message to the browser/WIC 1211.

In step 1242, the UA 1213 requests the media proxy 1214 to initiate the transmission and reception of real time communication data.

In step 1243, the communication of RTP data is executed between the browser/WIC 1211 and the media proxy 1214. In step 1244, as the communication of RTP data is executed between the media proxy 1214 and an eIMS-AGW 1223 of the IMS 1220 through the CP 1216, real time communication between the browser/WIC 1211 and the partner device is executed through the IMS PDN. The eIMS-AGW 1223 executes encoding/decoding to match the data formats between the electronic device 1210 and the partner device when the formats are different, and transmits, to the eP-CSCF 1222 or the electronic device 1210, the RTP data of which the format is converted.

In step 1245, the electronic device 1210 moves to a region where the IMS/PDN is not supported, i.e, a region where VoLTE is not supported.

Referring to FIG. 12B, in step 1246, the CP 1216 receives a signal indicating a handover, such as a single radio voice call continuity (SRVCC). The CP 1216 transmits an IPC_CALL_SRVCC message indicating a handover to the telephony/RIL 1215. The telephony/RIL 1215 indicates a telephony module and/or an RIL.

In step 1247, the telephony/RIL 1215 transmits, to the UA 1213, an SRVCC success message indicating a handover.

In step 1248, the UA 1213 requests the media proxy 1214 to change an RTP communication section or route between the media proxy 1214 and the eIMS-AGW 1223 into a PCM communication section or route between the media proxy 1214 and the CP 1216. When the network switching is completed, a user may resume a 3GPP/3GPP2 CS call after the SRVCC through a web browser.

In step 1249, the communication of RTP data is executed between the browser/WIC 1211 and the media proxy 1214. In step 1250, as the communication of PCM data is executed between the media proxy 1214 and the CP 1216, real time communication between the browser/WIC 1211 and the partner device is executed through the 3GPP/3GPP2 CS network.

In step 1251, the browser/WIC 1211 receives an input for requesting the termination of a call through a screen that provides a WebRTC service.

In step 1252, the browser/WIC 1211 requests the termination of a call from the UA 1213.

In step 1253, the UA 1213 requests the termination of the call from the telephony/RIL 1215.

In step 1254, the telephony/RIL 1215 transmits, to the CP 1216, a message such as IPC_CALL_RELEASE that requests the termination of the call.

Figure 13:
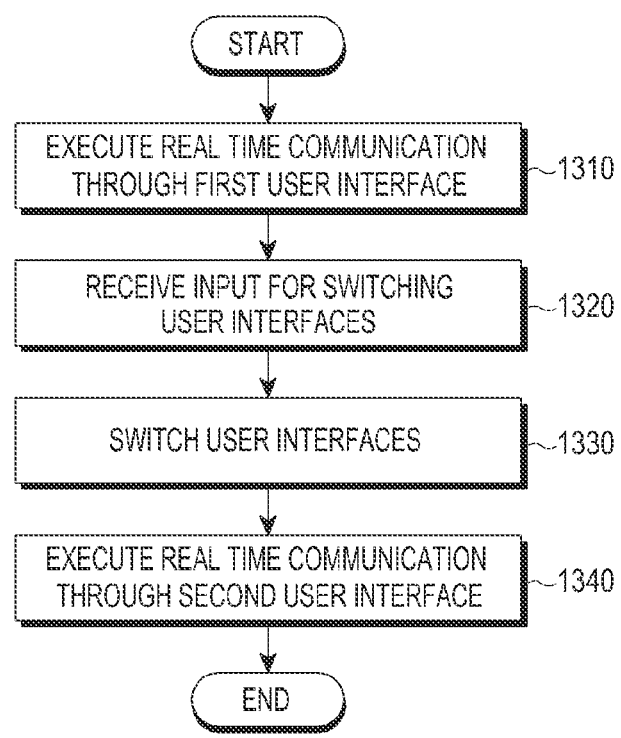

FIG. 13 illustrates a communication method of an electronic device according to embodiments of the present disclosure. In step 1310, a controller of an electronic device executes real time communication through a first user interface such as a web browser or a phone application. For example, the controller executes real time communication through a screen of the web browser that provides a WebRTC service, or executes real time communication through the phone application.

In step 1320, the controller receives an input for switching user interfaces, such as through a screen that provides a WebRTC service. According to an embodiment of the present disclosure, the controller receives an input for switching user interfaces through a screen of the phone application.

In step 1330, the controller executes switching user interfaces. The controller terminates or deactivates the first user interface and provides a second user interface. For example, the controller terminates or deactivates the web browser and provides a screen of the phone application, or terminates or deactivates the phone application and provides a screen of the web browser.

In step 1340, the controller executes real time communication through the second user interface.

According to an embodiment of the present disclosure, the controller suspends the real time communication with the partner device through the first user interface, for switching user interfaces, and resumes real time communication with the partner device through the second user interface after switching the user interfaces.

Figure 14A:
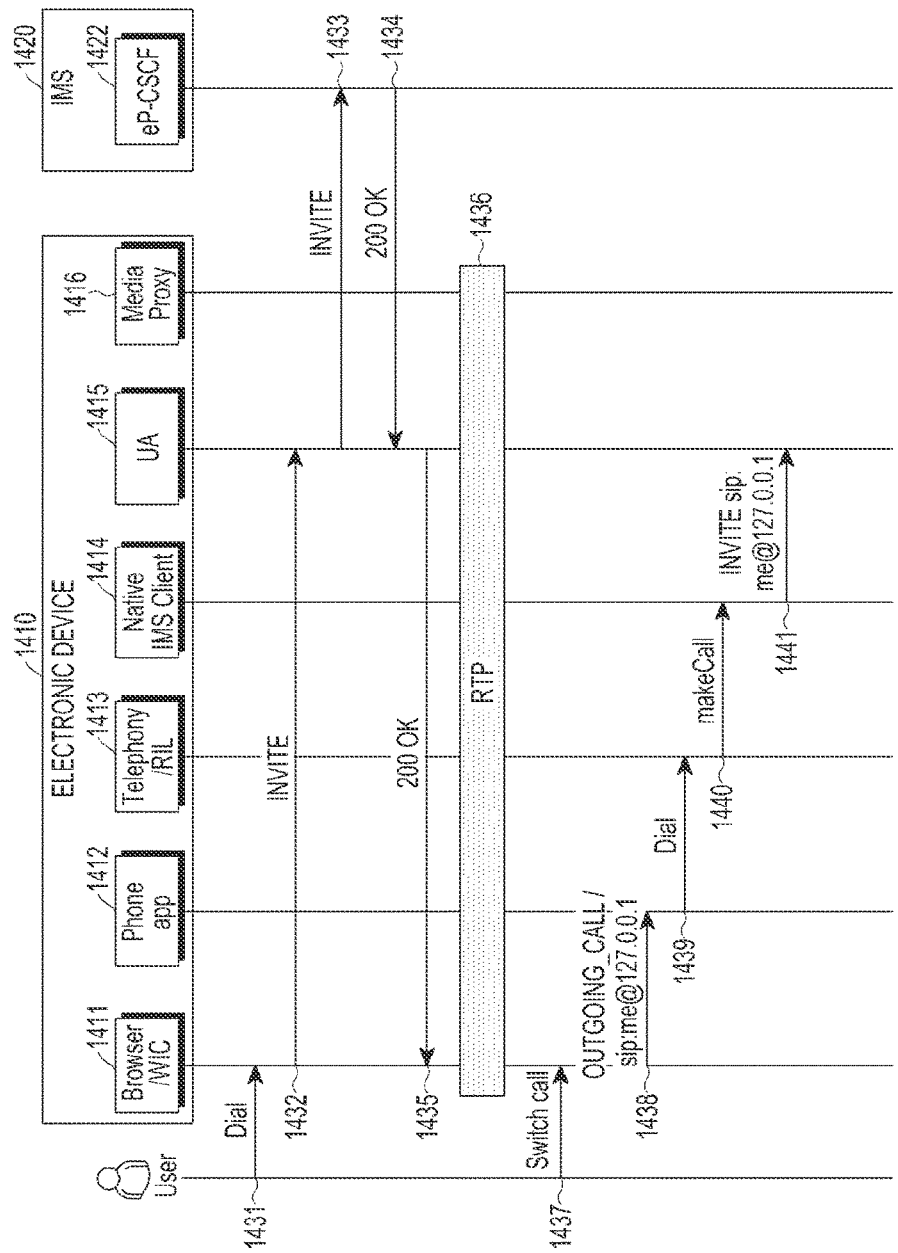
Figure 14B:
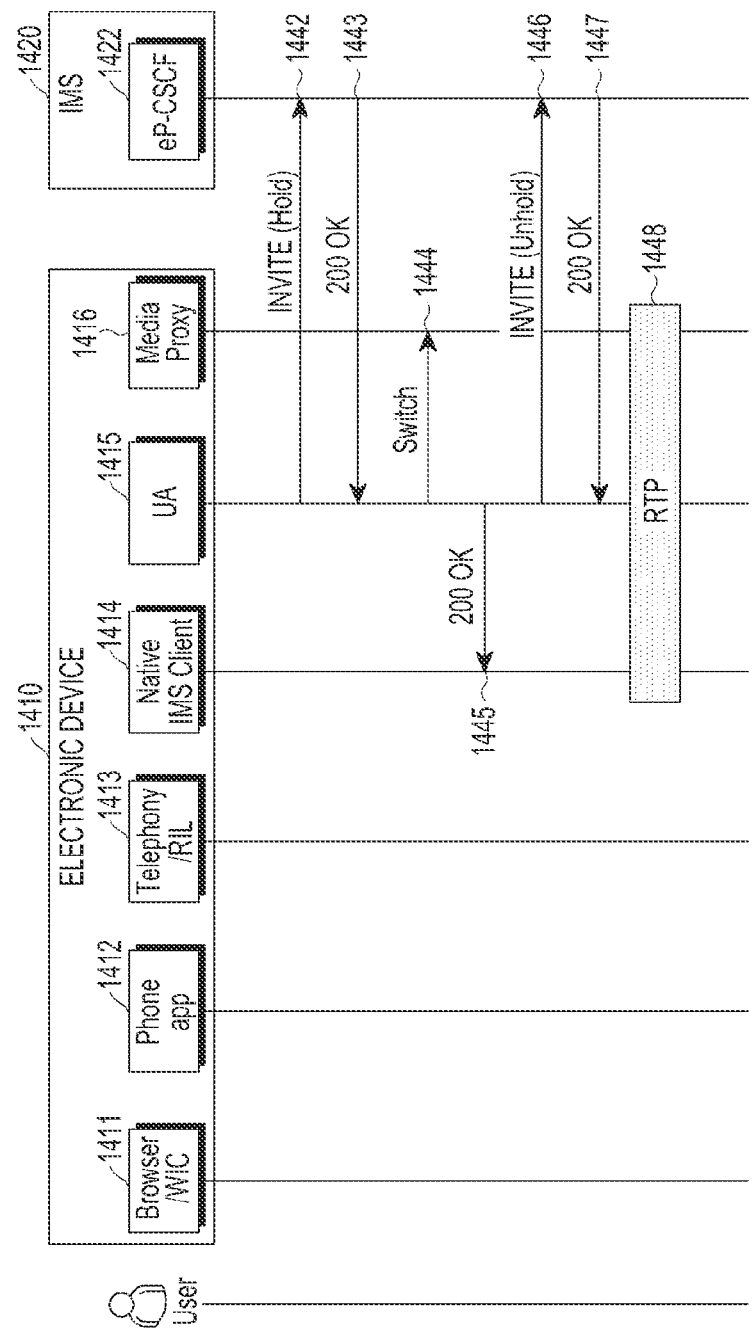

FIGS. 14A and 14B illustrate a communication method of an electronic device according to embodiments of the present disclosure. In step 1431, the browser/WIC 1411 receives a call connection request over an IMS PDN through a screen that provides a WebRTC service.

In step 1432, the browser/WIC 1411 transmits an INVITE message to the UA 1145 so as to initiate a call. The INVITE message includes identification information such as a phone number associated with the destination of the call, and the UA 1415 determines the target of the call to be initiated based on the identification information.

In step 1433, the UA 1415 corrects SDP data in the INVITE message by changing, into a media proxy 1416, an address to which the real time communication data (or media packet) is to be transmitted, and transmits the INVITE message to an eP-CSCF 1422 of an IMS 1420.

In step 1434, the eP-CSCF 1422 transmits a 200 OK message including information associated with the Connected state in which a partner device grants a call connection request. The UA 1415 receives the 200 OK message including the state information through a CP.

In step 1435, the UA 1415 corrects SDP data included in the 200 OK message that includes the state information by changing, into the media proxy 1416, an address to which the real time communication data or a media or RTP packet is to be transmitted, and transmits the 200 OK message to the browser/WIC 1411.

In step 1436, the communication of RTP data is executed between the browser/WIC 1411 and the media proxy 1416. As the communication of RTP data is executed between the media proxy 1416 and an eIMS-AGW through the CP, real time communication between the browser/WIC 1211 and the partner device is executed through the IMS PDN.

In step 1437, the browser/WIC 1411 receives a request for switching user interfaces through a screen that provides a WebRTC service.

In step 1438, the browser/WIC 1411 requests a phone application 1412 to initiate a new call, by transmitting an OUTGOING_CALL message that includes the "sip:me@127.0.0.1" content set in advance to request a call for switching user interfaces. The content set in advance may be a previously set number, URI, or the like. The number or URI may have a predetermined value under a condition in which the browser/WIC 1411, the phone application 1412, or a native IMS client 1414 corresponding to a second client agree to use the number or URI, to switch calls internally, which is not known to the IMS 1420. The native IMS client 1414 is configured to provide a real time communication service by controlling the phone application 1412.

In step 1439, the phone application 1412 requests telephony/RIL 1413 to initiate a call.

In step 1440, the telephony/RIL 1413 requests the native IMS client 1414 to initiate the call.

In step 1441, the native IMS client 1414 requests the UA 1415 to begin the call. The native IMS client 1414 transmits, to the UA 1415, an INVITE message that includes the "sip:me@127.0.0.1" content set in advance to request a call for switching user interfaces. Although a method for the native IMS client 1414 to determine requesting the UA 1415 to initiate a call is not limited, the present example uses a method in which the native IMS client 1414 makes a decision using the content or number set in advance, which the native IMS client 1414 receives.

Referring to FIG. 14B, in step 1442, the UA 1415 transmits, to the eP-CSCF 1422, an INVITE(hold) message that requests the suspension of the real time communication over a currently established call connection.

In step 1443, the eP-CSCF 1422 transmits a 200 OK message that includes information associated with the hold state in which the real time communication over the currently established call connection is suspended. The UA 1415 receives a 200 OK message including the state information through a CP.

In step 1444, the UA 1415 requests the media proxy 1416 to change an RTP communication section or route between the media proxy 1416 and the browser/WIC 1411 into an RTP communication section or route between the media proxy 1416 and the native IMS client 1414.

In step 1445, the UA 1415 transmits, to the native IMS client 1414, a 200 OK message containing information associated with the state in which switching user interfaces is completed.

In step 1446, the UA 1415 transmits, to the eP-CSCF 1422, an INVITE(Unhold) message that requests the resumption of the real time communication through the currently established call connection.

In step 1447, the eP-CSCF 1422 transmits a 200 OK message containing information associated with the unhold state in which the real time communication through the currently established call connection is resumed, to the UA 1415. The UA 1415 receives the 200 OK message including the state information through a CP.

In step 1448, as the communication of RTP data is executed between the media proxy 1416 and the native IMS client 1414, the real time communication between the phone application 1412/native IMS client 1414 and the partner device over the IMS/PDN may be resumed.

Figure 15:
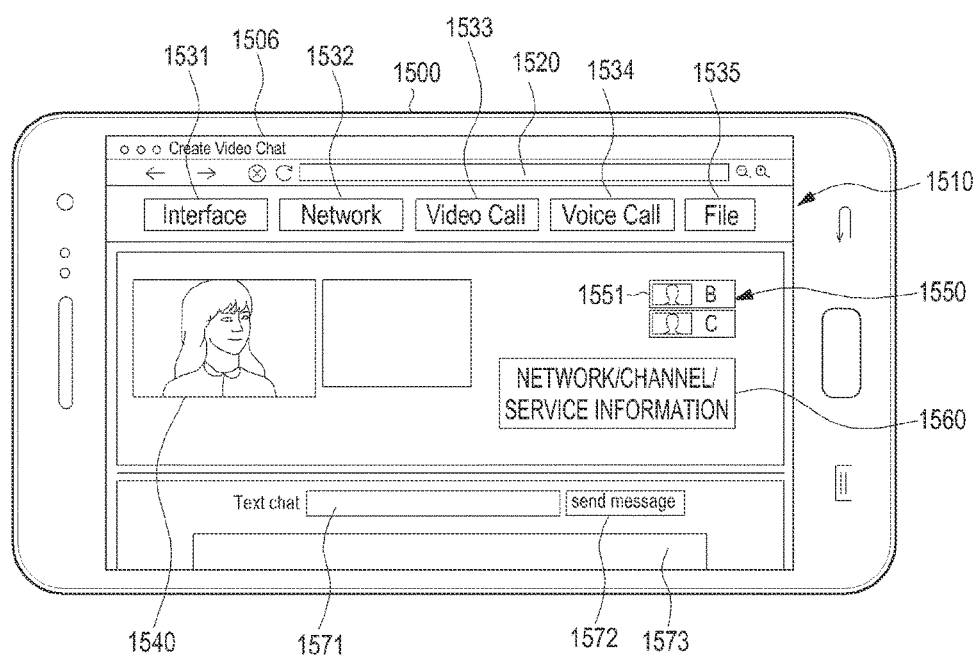
FIGS. 15 and 16 illustrate examples of a WebRTC screen according to embodiments of the present disclosure.
Figure 16:
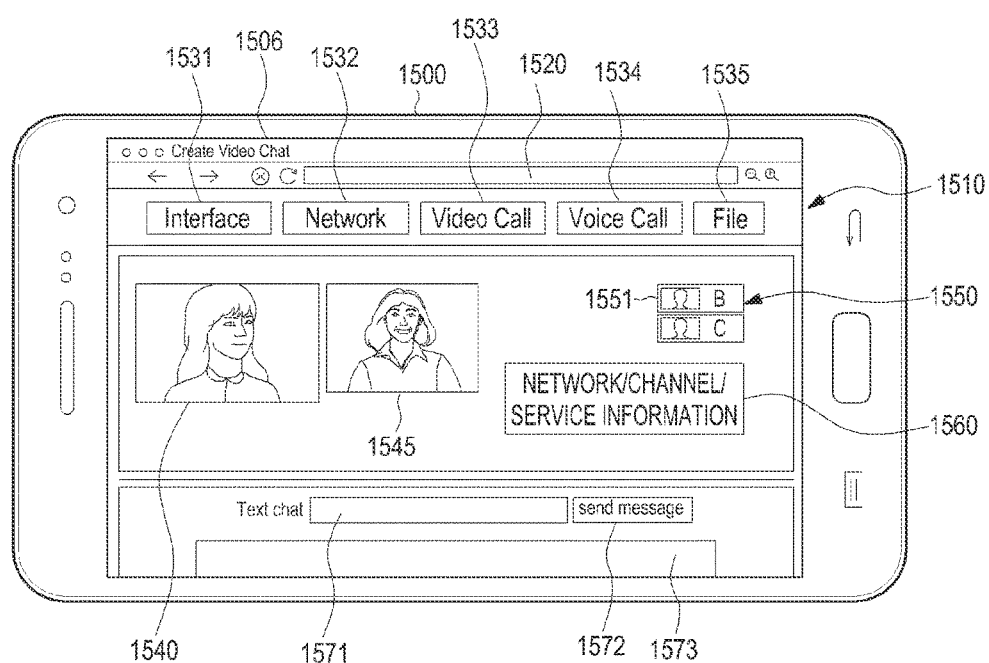

FIGS. 15 and 16 illustrate examples of a WebRTC screen.

Referring to FIG. 15, a screen 1510 of a web browser may be displayed on a display 1506 of an electronic device 1500.

The screen 1510 of the web browser includes an address input bar 1520 for inputting an IP address (and a port). For example, the controller receives an address input by a user with respect to the address input bar 1520, and controls the web browser to access a web server, a website, or a WWSF that provides a WebRTC connection corresponding to the address.

The screen 1510 of the web browser includes at least one of a first item 1531 for switching interfaces, such as between a web browser and a phone application, a second item 1532 for switching networks, such as WiFi/IMS/3GPP/3GPP2 CS networks, a third item 1533 for a video call, a fourth item 1534 for a voice call, and a fifth item 1535 for file transmission. For example, when one of the first to fifth items 1531 to 1535 is selected, the controller executes a function corresponding to the selected item.

The screen 1510 of the web browser includes a first video screen 1540 that is captured by a camera of the electronic device 1500.

The screen 1510 of the web browser includes a contact list (a contact number list) 1550 including contacts (or contact numbers) 1551 registered in the web server or the electronic device 1500. For example, when one of the contacts 1551 is selected, the controller controls the web browser to execute the real time communication with the selected contact.

The screen 1510 of the web browser includes a network/channel/service information screen part/area 1560 that displays information associated with a currently connected network, such as MCC, MNC, RAT, RSSI, and/or characteristic information such as QoS or security level of a currently used channel or circuit. The network/channel/service information screen part/area 1560 displays that a call is currently executed through the IMS PDN, LTE, or 3GPP/3GPP2 CS network, or through WiFi, for example, displays that a call is executed through a secure channel, displays that a network is switched among LTE/WiFi/3GPP/3GPP2 CS networks, or displays that LTE and WiFi are simultaneously used.

The screen 1510 of the web browser includes a text input bar for inputting text, a transmission button 1572 for transmitting input text, and a message window 1573 for displaying transmitted and received messages.

Referring to FIG. 16, the controller detects a user input associated with the contact 1551 of user B, establishes a connection with an electronic device of user B, and executes a video call with the electronic device of user B. The screen 1510 of the web browser includes the first video screen 1540, which is captured by a camera of the electronic device, and a second video screen 1545 displaying a second video received from the electronic device of user B.

The first and second videos may be real-time videos generated by photographing a user through cameras of corresponding electronic devices. The electronic device 1500 transmits the real-time video of the user to the electronic device of user B. The electronic device 1500 displays the second video received from the electronic device of user B, on the display 1506. The electronic device 1500 transmits the voice of the user, recorded using a microphone, to the electronic device of user B. The electronic device 1500 outputs the voice received from the electronic device of user B through a speaker. The electronic device 1500 transmits, to the electronic device of user B, a text input by the user into the text input bar 1571 in response to a selection of a message sending button 1572. The electronic device 1500 displays the transmitted message and the message received from the electronic device of user B on the message window 1573. The electronic device 1500 detects a user input of the fourth item 1534 for the voice call and a user input of one of the contacts of the contact list 1550, establishes a connection with the electronic device of the selected contact (or a user of the selected contact), and performs the voice call with the electronic device of the selected contact. During the voice call, the electronic device 1500 transmits the voice of the user, recorded using the microphone, to the electronic device of the selected contact in real time, and outputs the voice received from the electronic device of the selected contact through the speaker in real time. The electronic device 1500 detects a user input of the fifth item 1535 for the file transfer, displays a file search window, and transmits a file selected by the user to the electronic device of user B.

According to embodiments of the present disclosure, a communication method of an electronic device includes executing a web browser, requesting registration in an IMS using a first client associated with the web browser, and displaying, in a part of the web browser, information associated with a network to which the electronic device is connected by using the first client.

According to embodiments of the present disclosure, a communication method of an electronic device includes executing a web browser, receiving real time communication data from a partner device through an IMS or 3GPP/3GPP2 CS network, and outputting the real time communication data using the web browser.

According to embodiments of the present disclosure, displaying the information associated with the network in a part of the web browser includes receiving, from the CP through a telephony module, at least one of information associated with a network to which the electronic device is connected and characteristic information of a channel that the electronic device currently uses, and displaying the received information through the web browser.

According to embodiments of the present disclosure, the method may further include receiving an execution instruction of a service from among a voice call, a video call, sharing an image, and P2P file transmission using partner identification information, through an interface provided from the web browser, and displaying information associated with the service in a part of the web browser when the service is executed.

According to embodiments of the present disclosure, at least one of the information associated with the service and the information associated with the network to which the electronic device is connected includes at least one of a notification indicating that a VoLTE call is currently executed, that packet communication through an IMS PDN is currently executed, that a call is executed through a secure channel, that switching between LTE and WiFi is performed, and that LTE and WiFi are simultaneously used.

According to embodiments of the present disclosure, the method includes accessing a web server using the web browser, receiving loading data for loading the first client from the web server, and loading the first client into the electronic device using the loading data.

According to embodiments of the present disclosure, the electronic device includes a first client that is configured to control the web browser and to provide a real time communication service.

According to embodiments of the present disclosure, the electronic device includes a first client that is configured to control the web browser and to provide a real time communication service, and the method includes receiving loading data for loading the first client from a web server, and loading the first client into the electronic device using the loading data.

According to embodiments of the present disclosure, the method further includes establishing a communication connection between the electronic device and a PDN, wherein the communication connection includes a web socket connection, and real time communication data is received from the partner device through the communication connection.

According to embodiments of the present disclosure, the electronic device includes a communication processor that is configured to communicate with the IMS or 3GPP/3GPP2 CS network, and the method further includes executing a control using a first API to enable the CP to establish a communication connection between the electronic device and the PDN.

According to embodiments of the present disclosure, the electronic device includes a communication processor configured to communicate with the IMS or the 3GPP/3GPP2 CS network, and a telephony module configured to communicate with the CP, and the method further includes executing a control using a first API to enable the telephony module to request, from the CP, a communication connection between the electronic device and a PDN; and establishing, by the CP, the communication connection between the electronic device and the PDN.

According to embodiments of the present disclosure, the method further includes registering, in the IMS, subscriber identification information stored in the electronic device.

According to embodiments of the present disclosure, the method further includes obtaining subscriber identification information stored in a SIM using a communication processor of the electronic device, and transmitting, to the IMS, a registration message that includes the subscriber identification information.

According to embodiments of the present disclosure, the method further includes obtaining subscriber identification information stored in a SIM using a communication processor of the electronic device, and transmitting, to the IMS, a registration message containing the subscriber identification information, and the subscriber identification information includes at least one of an IMPI and an IMPU.

According to embodiments of the present disclosure, the method further includes obtaining subscriber identification information stored in a SIM using a communication processor of the electronic device, and transmitting, to the IMS, a registration message containing the subscriber identification information, the subscriber identification information includes at least one of an IMPI and an IMPU, and the registration message further includes an identifier indicating a web socket connection.

According to embodiments of the present disclosure, the electronic device includes a communication processor configured to communicate with the IMS or the 3GPP/3GPP2 CS network, and a telephony module configured to communicate with the CP, and the method further includes executing a control using an API to enable the telephony module to request subscriber identification information from the CP, obtaining, by the CP, the subscriber identification information stored in a SIM, and transmitting, to the IMS, a registration message containing the subscriber identification information.

According to embodiments of the present disclosure, the electronic device includes a communication processor configured to communicate with the IMS or the 3GPP/3GPP2 CS network, and a telephony module configured to communicate with the CP, and the method further includes executing a control using a second API to enable the telephony module to request subscriber identification information from the CP, obtaining, by the CP, the subscriber identification information stored in a SIM, and transmitting, to the IMS, a registration message including the subscriber identification information.

According to embodiments of the present disclosure, the method further includes obtaining subscriber identification information stored in a SIM using a communication processor of the electronic device, transmitting a registration message that includes the subscriber identification information to an IMS of the communication network, receiving a first message that includes a first value from the IMS, and generating a second value based on the first value and transmitting a second message that includes the second value to the IMS.

According to embodiments of the present disclosure, information associated with the IMS, the PDN, or the 3GPP/3GPP2 CS network is displayed in the web browser.

According to embodiments of the present disclosure, the method further includes receiving a user input through the web browser, and establishing a call connection between the electronic device and the partner device through the 3GPP/3GPP2 CS network in response to the user input.

According to embodiments of the present disclosure, the electronic device includes a communication processor configured to communicate with the IMS or the 3GPP/3GPP2 CS network, and the method further includes receiving a user input through the web browser, establishing a call connection between the electronic device and the partner device through the 3GPP/3GPP2 CS network in response to the user input, converting the real time communication data provided in a format supported by the web browser into the real time communication data of a format supported by the 3GPP/3PP2 CS network, and transmitting, by the CP, the real time communication data of which the format is converted, to the partner device through the call connection.

According to embodiments of the present disclosure, the electronic device includes a first client configured to control the web browser and to provide a real time communication service, a communication processor configured to communicate with the IMS or the 3GPP/3GPP2 CS network, a telephony module configured to communicate with the CP, and a user agent configured to communicate with each of the first client and the telephony module, and the method includes registering the first client in the user agent, transmitting, by the first client, a message containing identification information of the partner device to the user agent, requesting, by the user agent, a call to the partner device from the telephony module, requesting, by the telephony module, a call to the partner device from the CP, and establishing, by the CP, a call connection between the electronic device and the partner device through the 3GPP/3GPP2 CS network.

According to embodiments of the present disclosure, the method further includes converting the format of real time communication data received from the partner device into a format supported by the web browser.

According to embodiments of the present disclosure, the electronic device includes a communication processor configured to communicate with the IMS or the 3GPP/3GPP2 CS network, and the method further includes receiving a user input through the web browser, establishing, by the CP, a call connection between the electronic device and the partner device through the 3GPP/3GPP2 CS network in response to the user input, and converting the format of real time communication data received from the partner device through the call connection into a format supported by the web browser.

According to embodiments of the present disclosure, the electronic device includes a first client configured to control the web browser and to provide a real time communication service, a communication processor configured to communicate with the IMS or 3GPP/3GPP2 CS network, and a media proxy configured to communicate with each of the first client and the CP, and the method further includes receiving, by the media proxy, real time communication data from the CP, converting, by the media proxy, the format of real time communication data into a format supported by the web browser, and transmitting to the first client, by the media proxy, the real time communication data of which the format is converted.

According to embodiments of the present disclosure, receiving the real time communication data includes receiving real time communication data through a PDN, receiving a signal indicating a handover, receiving real time communication data through the 3GPP/eGPP2 CS network in response to the signal indicating a handover, and converting the format of the real time communication data received through the 3FPP/3GPP2 CS network into a format supported by the web browser.

According to embodiments of the present disclosure, the electronic device includes a first client configured to control the web browser and to provide a real time communication service a communication processor configured to communicate with the IMS or the 3GPP/3GPP2 CS network, and a media proxy configured to communicate with each of the first client and the CP, and receiving the real time communication data further includes receiving, by the CP, real time communication data through a PDN, receiving, by the CP, a signal indicating a handover, receiving, by the CP, real time communication data through the 3GPP/3GPP2 CS network in response to the signal indicating the handover, converting, by the media proxy, the format of real time communication data received through the 3GPP/3GPP2 CS network into a format supported by the web browser, and transmitting to the first client, by the media proxy, the real time communication data of which the format is converted.

According to embodiments of the present disclosure, the method includes receiving a user input through the web browser, and outputting, through a phone application, real time communication data received from the partner device in response to the user input.

According to embodiments of the present disclosure, the method includes receiving a user input through the web browser, transmitting, to the IMS, a first message indicating the suspension of real time communication, in response to the user input, transmitting, to the IMS, a second message indicating the resumption of real time communication, and outputting, through a phone application, real time communication data received from the partner device.

According to embodiments of the present disclosure, the electronic device includes a first client configured to control the web browser and to provide a real time communication service, a second client configured to control a phone application and to provide a real time communication service, a communication processor configured to communicate with the IMS or 3GPP/3GPP2 CS network, and a media proxy configured to communicate with each of the first client, the second client, and the CP, and the method includes receiving, by the media proxy, first real time communication data from the CP, transmitting, by the media proxy, the first real time communication data to the first client, receiving a user input through the web browser, receiving, by the media proxy, second real time communication data from the CP, transmitting, by the media proxy, the second real time communication data to a second client in response to the user input, and outputting, by the second client, the second real time communication data through the phone application.

According to embodiments of the present disclosure, the electronic device includes a first client configured to control the web browser and to provide a real time communication service, a second client configured to control a phone application and to provide a real time communication service, a communication processor configured to communicate with the IMS or 3GPP/3GPP2 CS network, a media proxy configured to communicate with each of the first client, the second client, and the CP, and a user agent.

The method includes receiving, by the media proxy, first real time communication data from the CP, transmitting, by the media proxy, the first real time communication data to the first client, receiving a user input through the web browser, transmitting, by the user agent, a first message indicating the suspension of real time communication to the IMS through the CP in response to the user input, requesting, by the user agent, the media proxy to transmit real time communication data to a second client, transmitting, by the user agent, a second message indicating the resumption of real time communication to the IMS through the CP, receiving, by the media proxy, second real time communication data from the CP, transmitting, by the media proxy, the second real time communication data to the second client, and outputting, by the second client, the second real time communication data through the phone application.

According to embodiments of the present disclosure, an electronic device includes a display, a CP configured to communicate with an IMS or 3GPP/3GPP2 CS network, and a controller configured to execute a web browser, to request registration in the IMS through the CP using a first client associated with the web browser, and to display information associated with a network to which the electronic device is connected in a part of the web browser through the display using the first client.

According to embodiments of the present disclosure, an electronic device includes, a display, a communication processor configured to communicate with an IMS or a 3GPP/3GPP2 CS network, and a controller configured to execute a web browser, to control the display to display a screen of the executed web browser, to receive real time communication data from a partner device through the IMS or 3GPP/3GPP2 CS network, and to output the real time communication data using the web browser.

According to embodiments of the present disclosure, the controller is configured to access a web server using the web browser, to receive installation data for installing a first client from the web server, and to install the first client in the electronic device using the installation data.

According to embodiments of the present disclosure, the controller is configured to execute a first client that is configured to control the web browser and to provide a real time communication service.

According to embodiments of the present disclosure, the controller is configured to establish a communication connection between the electronic device and a PDN, the communication connection includes a web socket connection, and real time communication data is received from the partner device through the communication connection.

According to embodiments of the present disclosure, the controller is configured to establish a communication connection between the electronic device and a PDN through the CP using a first API.

According to embodiments of the present disclosure, the electronic device includes a telephony module configured to communicate with the CP, and the controller is configured to request, from the CP, a communication connection between the electronic device and a PDN using the first API and the telephony module, and to establish the communication connection between the electronic device and the PDN through the CP.

According to embodiments of the present disclosure, the controller is configured to register, in the IMS, subscriber identification information stored in the electronic device.

According to embodiments of the present disclosure, the controller is configured to obtain subscriber identification information stored in a SIM using the CP, and to transmit a registration message containing the subscriber identification information to the IMS through the CP.

According to embodiments of the present disclosure, the controller is configured to obtain subscriber identification information stored in a SIM using the CP, and to transmit a registration message that includes the subscriber identification information to the IMS through the CP, and the subscriber identification information includes at least one of an IMPI and an IMPU.

According to embodiments of the present disclosure, the controller is configured to obtain subscriber identification information stored in a SIM using the CP, and to transmit a registration message containing the subscriber identification information to the IMS through the CP, and the subscriber identification information includes at least one of an IMPI and an IMPU, and the registration message further includes an identifier indicating a web socket connection.

According to embodiments of the present disclosure, the electronic device includes a telephony module configured to communicate with the CP, and the controller is configured to request subscriber identification information from the CP using an API and the telephony module, to obtain the subscriber identification information stored in a SIM using the CP, and to transmit, to the IMS, a registration message that includes the subscriber identification information through the CP.

According to embodiments of the present disclosure, the electronic device includes a telephony module configured to communicate with the CP, and the controller is configured to receive a user input associated with the use of a second API, to request subscriber identification information from the CP using the second API and the telephony module, to obtain the subscriber identification information stored in a SIM using the CP, and to transmit, to the IMS, a registration message that includes the subscriber identification information through the CP.

According to embodiments of the present disclosure, the controller is configured to obtain subscriber identification information stored in a SIM using the CP, to transmit a registration message including the subscriber identification information to the IMS through the CP, to receive a first message including a first value from the IMS through the CP, and to transmit a second message including a second value generated based on the first value to the IMS through the CP.

According to embodiments of the present disclosure, the controller may be configured to display information associated with the PDN, the IMS, or the 3GPP/3GPP2 CS network in the web browser through the display.

According to embodiments of the present disclosure, the controller is configured to receive a user input through the web browser; and to establish a call connection between the electronic device and the partner device over the 3GPP/3GPP2 CS network through the CP in response to the user input.

According to embodiments of the present disclosure, the controller is configured to receive a user input through the web browser, to establish a call connection between the electronic device and the partner device over the 3GPP/3GPP2 CS network through the CP, to convert the real time communication data of a format supported by the web browser into the real time communication data of a format supported by the 3GPP/3GPP2 CS network, and to transmit, to the partner device through the call connection using the CP, the real time communication data of which the format is converted.

According to embodiments of the present disclosure, the electronic device includes a first client configured to control the web browser and to provide a real time communication service, a telephony module configured to communicate with the CP, and a user agent configured to communicate with each of the first client and the telephony module, and the method includes registering the first client in the user agent, transmitting, using the first client, a message containing identification information of the partner device to the user agent, requesting, using the user agent, a call to the partner device from the telephony module, requesting, using the telephony module, a call to the partner device from the CP, and establishing, using the CP, a call connection between the electronic device and the partner device through the 3GPP/3GPP2 CS network.

According to embodiments of the present disclosure, the controller is configured to convert the format of real time communication data received from the partner device into a format supported by the web browser.

According to embodiments of the present disclosure, the controller is configured to receive a user input through the web browser in order to establish a call connection between the electronic device and the partner device over the 3GPP/3GPP2 CS network through the CP in response to the user input, and to convert the format of the real time communication data received from the partner device through the call connection into the format supported by the web browser.

According to embodiments of the present disclosure, the electronic device includes a first client configured to control the web browser and to provide a real time communication service; and a media proxy configured to communicate with each of the first client and the CP, and the controller is configured to receive real time communication data from the CP using the media proxy, to convert, using the media proxy, the format of the real time communication data into a format that is supported by the web browser, and to transmit, using the media proxy, the real time communication data of which the format is converted to the first client.

According to embodiments of the present disclosure, the controller is configured to receive real time communication data through a PDN, to receive a signal indicating a handover through the CP, to receive real time communication data through the 3GPP/3GPP2 CS network in response to the signal indicating the handover, and to convert the format of real time communication data received through the 3GPP/3GPP2 CS network into the format supported by the web browser.

According to embodiments of the present disclosure, the electronic device includes a first client configured to control the web browser and to provide a real time communication service, and a media proxy configured to communicate with each of the first client and the CP, and the controller is configured to receive real time communication data through a PDN, to receive a signal indicating a handover through the CP, to receive real time communication data through the 3GPP/3GPP2 CS network in response to the signal indicating the handover, to convert, using the media proxy, the format of the real time communication data received through the 3GPP/3GPP2 CS network into the format supported by the web browser, to transmit to the first client, using the media proxy, the real time communication data of which the format is converted.

According to embodiments of the present disclosure, the controller is configured to receive a user input through the web browser, and to output, through a phone application, real time communication data received from the partner device in response to the user input.

According to embodiments of the present disclosure, the controller is configured to receive a user input through the web browser, to transmit, through the CP, a first message indicating the suspension of real time communication to the IMS, in response to the user input, to transmit, through the CP, a second message indicating the resumption of real time communication to the IMS, and to output, through a phone application, real time communication received from the partner device.

According to embodiments of the present disclosure, the electronic device includes a first client configured to control the web browser and to provide a real time communication service, a second client configured to control a phone application and to provide a real time communication service, and a media proxy configured to communicate with each of the first client, the second client, and the CP, and the controller is configured to receive, using the media proxy, first real time communication data from the CP, to transmit, using the media proxy, the first real time communication data to the first client, to receive a user input through the web browser, to receive, using the media proxy, second real time communication data from the CP, to transmit, using the media proxy, the second real time communication data to a second client in response to the user input, and to output the second real time communication data through the phone application.

According to embodiments of the present disclosure, the electronic device includes a first client configured to control the web browser and to provide a real time communication service, a second client configured to control a phone application and to provide a real time communication service, a media proxy configured to communicate with each of the first client, the second client, and the CP, and a user agent, and the controller is configured to receive, using the media proxy, first real time communication data from the CP, to transmit, using the media proxy, the first real time communication data to the first client, to receive a user input through the web browser, to transmit, using the user agent, a first message indicating the suspension of real time communication to the IMS through the CP in response to the user input, to request, using the user agent, the media proxy to transmit real time communication data to a second client, to transmit, using the user agent, a second message indicating the resumption of real time communication to the IMS through the CP, to receive, using the media proxy, second real time communication data from the CP, to transmit, using the media proxy, the second real time communication data to the second client, and to output the second real time communication data through the phone application.

Figure 17:
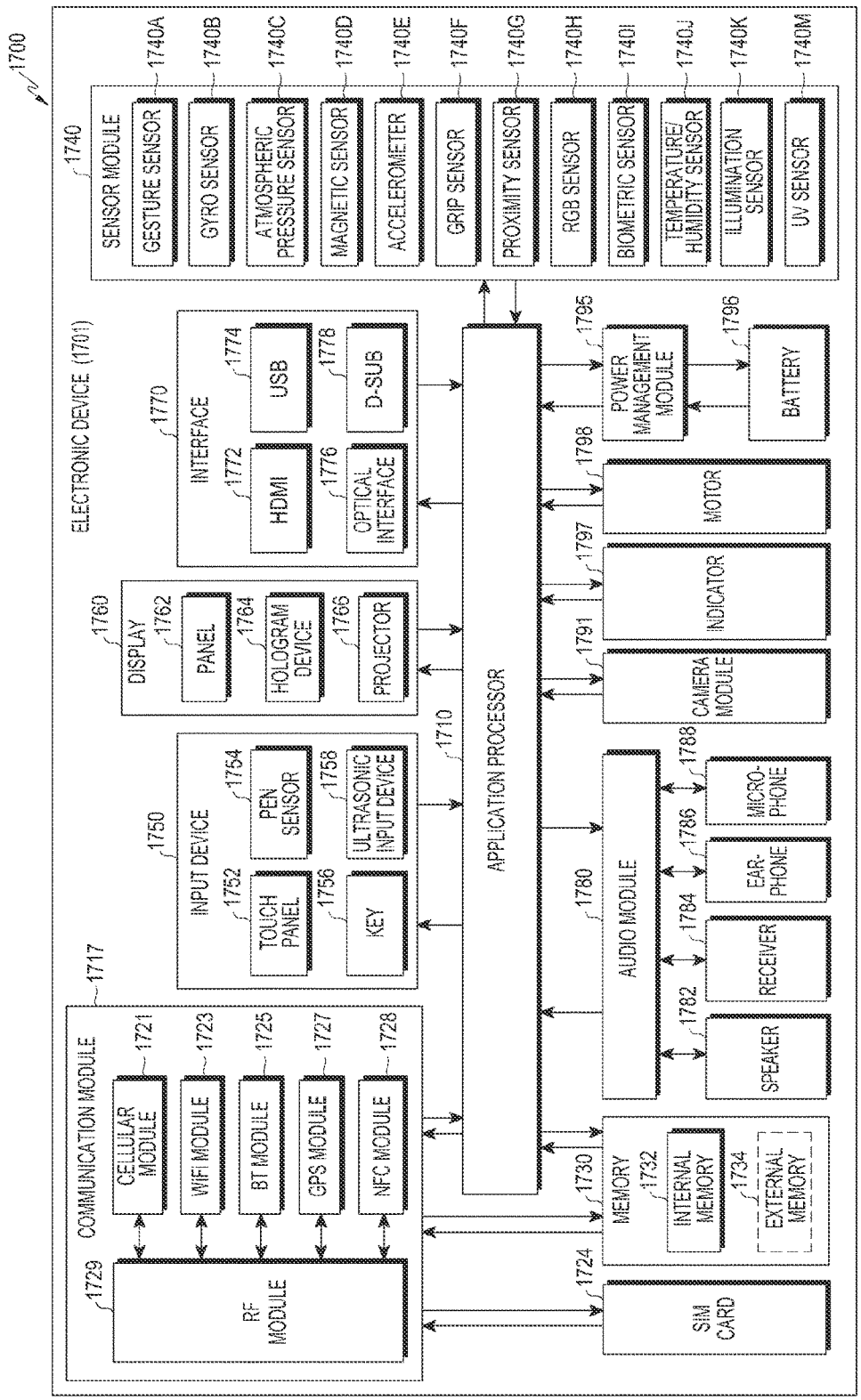
FIG. 17 illustrates an electronic device according to embodiments of the present disclosure.

FIG. 17 is a block diagram 1700 of an electronic device 1701 according to embodiments of the present disclosure. The electronic device 1701 may form, for example, a part or the entirety of the electronic device 101 illustrated in FIG. 1.

Referring to FIG. 17, the electronic device 1701 includes at least one AP 1710, a communication module 1720, a SIM card 1724, a memory 1730, a sensor module 1740, an input module 1750, a display 1760, an interface 1770, an audio module 1780, a camera module 1791, a power management module 1795, a battery 1796, an indicator 1797, and a motor 1798.

The AP 1710 controls a plurality of hardware or software components connected thereto by driving an operating system or an application program, processes various types of data including multimedia data, and performs calculations. The AP 1710 may be embodied as, for example, a system on chip (SoC), and may further include a graphic processing unit (GPU).

The communication module 1720 performs data transmission/reception in communication between the electronic device 1701 and other electronic devices connected thereto through a network. According to an embodiment, the communication module 1720 includes at least one of a cellular module 1721, a Wi-Fi module 1723, a BlueTooth® (BT) module 1725, a global positioning system (GPS) module 1727, a Near Field Communication (NFC) module 1728, and a Radio Frequency (RF) module 1729.

The cellular module 1721 provides at least one of a voice call, a video call, a message service, and an Internet service through a communication network such as LTE, LTE-A, CDMA, WCDMA, UMTS, WiBro, or GSM. The cellular module 1721 identifies and authenticates an electronic device in a communication network by using, for example, the SIM card 1724. According to an embodiment, the cellular module 1721 performs at least some of functions which the AP 1710 provides, such as a part of a multimedia control function.

According to an embodiment of the present disclosure, the CP may be included in the cellular module 1721, and the cellular module 1721 may be implemented by an SoC. Although the elements such as the cellular module 1721, the memory 1730, and the power management module 1795 are illustrated separate from the AP 1710 in FIG. 17, the AP 1710 may be implemented to include at least some of the above described elements according to one embodiment.

According to an embodiment of the present disclosure, the AP 1710 or the cellular module 1721 loads a command or data received from at least one of a non-volatile memory and other component elements connected to each of the AP 1710 and the cellular module 1721 to a volatile memory, processes the loaded command or data, and stores data received from or generated by at least one of the other component elements in a non-volatile memory.

The Wi-Fi module 1723, the BT module 1725, the GPS module 1727, and the NFC module 1728 include, for example, a processor for processing data transmitted/received through a corresponding module. Although the cellular module 1721, the Wi-Fi module 1723, the BT module 1725, the GPS module 1727, and the NFC module 1728 are illustrated as individual blocks in FIG. 17, at least two of these modules may be included within one Integrated Chip (IC) or one IC package. For example, at least some of processors corresponding to the cellular module 1721, the Wi-Fi module 1725, the BT module 1727, the GPS module 1728, and the NFC module 1728 may be implemented as one SoC.

The RF module 1729 transmits/receives data, for example, an RF signal. Although not illustrated, the RF module 1729 includes at least one of, for example, a transceiver, a power amp module (PAM), a frequency filter, and a low noise amplifier (LNA). The RF module 1729 further includes a component for transmitting/receiving an electromagnetic wave in free air space in radio communication, such as at least one of a conductor and a conducting wire. Although the cellular module 1721, the Wi-Fi module 1723, the BT module 1725, the GPS module 1727, and the NFC module 1728 are illustrated as sharing one RF module 1729 in FIG. 17, at least one of these modules may transmit/receive the RF signal through a separate RF module.

The SIM card 1724 is inserted into a slot formed in a particular portion of the electronic device, and includes unique identification information such as an ICCID or subscriber information such as an IMSI.

The memory 1730 includes an embedded memory 1732 and, optionally, an external memory 1734. The internal memory 1732 includes at least one of a volatile memory such as a dynamic random access memory (DRAM), a static RAM (SRAM), and a synchronous dynamic RAM (SDRAM), and a non-volatile memory such as a one time programmable read only memory (OTPROM), a programmable ROM (PROM), an erasable and programmable ROM (EPROM), an electrically erasable and programmable ROM (EEPROM), a mask ROM, a flash ROM, a NAND flash memory, and a NOR flash memory.

According to an embodiment of the present disclosure, the embedded memory 1732 may be a solid state drive (SSD). The external memory 1734 may further include a flash drive, such as at least one of a compact flash (CF), a secure digital (SD), a micro-SD, a Mini-SD, an extreme digital (xD), and a memory stick. The external memory 1734 may be functionally connected to the electronic device 1701 through various interfaces, and the electronic device 1701 may further include a storage device such as a hard drive.

The sensor module 1740 measures a physical quantity or detects an operation state of the electronic device 1701, and converts the measured or detected information to an electric signal. The sensor module 1740 includes, for example, at least one of a gesture sensor 1740A, a gyro sensor 1740B, an atmospheric pressure sensor 1740C, a magnetic sensor 1740D, an acceleration sensor 1740E, a grip sensor 1740F, a proximity sensor 1740G, a color sensor 1740H such as a red, green, and blue (RGB) sensor, a biometric sensor 1740I, a temperature/humidity sensor 1740J, an illumination sensor 1740K, and an ultra violet (UV) sensor 1740M. Additionally or alternatively, the sensor module 1740 may include an E-nose sensor, an electromyography (EMG) sensor, an electroencephalogram (EEG) sensor, an electrocardiogram (ECG) sensor, an infrared (IR) sensor, an iris sensor, and a fingerprint sensor. The sensor module 1740 further includes a control circuit for controlling at least one sensor included therein.

The input device 1750 includes a touch panel 1752, a (digital) pen sensor 1754, a key 1756, or an ultrasonic input device 1758. The touch panel 1752 recognizes a touch input through at least one of, for example, a capacitive scheme, a resistive scheme, an infrared scheme, and an ultrasonic scheme. The touch panel 1752 further includes a control circuit. A capacitive touch panel recognizes a physical contact or proximity. The touch panel 1752 further includes a tactile layer which provides a tactile reaction to a user.

The (digital) pen sensor 1754 may be embodied, for example, using a method identical or similar to a method of receiving a touch input of a user, or using a separate recognition sheet. The key 1756 includes, for example, a physical button, an optical key or a keypad. The ultrasonic input device 1758 generates an ultrasonic signal through an input tool, and identifies data by detecting a sonic wave through a microphone 1788 in the electronic device 1701, and is capable of wireless recognition. According to an embodiment, the electronic device 1701 receives a user input from an external device connected to the electronic device 801 by using the communication module 1720.

The display 1760 includes a panel 1762, a hologram device 1764, and a projector 1766. The panel 1762 may be, for example, a liquid crystal display (LCD), or an active-matrix organic light emitting diode (AM-OLED). The panel 1762 may be flexible, transparent, or wearable, and configured to be integrated with the touch panel 1752 as a single module. The hologram device 1764 displays a stereoscopic image in the air by using interference of light. The projector 1766 projects light onto a screen to display an image. For example, the screen may be located inside or outside the electronic device 1701. According to an embodiment of the present disclosure, the display 1760 further includes a control circuit for controlling the panel 1762, the hologram device 1764, or the projector 1766.

The interface 1770 includes, for example, an HDMI 1772, a universal Serial Bus (USB) 1774, an optical interface 1776, and a d-subminiature (D-sub) 1778. The interface 1770 may be included in, for example, the communication interface 170 illustrated in FIG. 1. Additionally or alternatively, the interface 1770 includes a mobile high-definition link (MHL) interface, an SD card/multi-media card (MMC) interface, or an infrared data association (IrDA) standard interface.

The audio module 1780 bidirectionally converts a sound and an electric signal. At least some components of the audio module 1780 may be included in, for example, the input/output interface 150 illustrated in FIG. 1. The audio module 1780 processes sound information input or output through, for example, at least one of a speaker 1782, a receiver 1784, earphones 1786, and the microphone 1788.

The camera module 1791 captures a still image or a video, and according to an embodiment, includes one or more image sensors such as a front sensor or a rear sensor), a lens, an image signal processor (ISP), and a flash such as an LED or xenon lamp.

The power management module 1795 manages electric power of the electronic device 1701, and includes a power management integrated circuit (PMIC), a charger IC, or a battery or fuel gauge.

The PMIC may be mounted to, for example, an integrated circuit or an SoC semiconductor. Charging methods may be classified into a wired charging method and a wireless charging method. The charger IC charges a battery and prevents over voltage or over current from a charger. According to an embodiment of the present disclosure, the charger IC includes a charger IC for at least one of the wired charging method and the wireless charging method. Examples of the wireless charging include magnetic resonance charging, magnetic induction charging, and electromagnetic charging, and an additional circuit such as a coil loop, a resonance circuit, and a rectifier may be added for the wireless charging.

The battery fuel gauge measure, for example, the remaining amount of battery, a charging voltage and current, or temperature. The battery 1796 stores or generates electricity, and supplies power to the electronic device 1701 using the stored or generated electricity. The battery 1796 includes, for example, a rechargeable battery or a solar battery.

The indicator 1797 displays a particular status of the electronic device 1701 or a part thereof, for example, at least one of a booting status, a message status, and a charging status. The motor 1798 converts an electric signal to a mechanical vibration. Although not illustrated, the electronic device 1701 includes a processing device such as a GPU) for supporting mobile TV. The processing device for supporting mobile TV processes media data according to a standard of digital multimedia broadcasting (DMB) digital video broadcasting (DVB), or media flow for example.

The above described components of the electronic device according to embodiments of the present disclosure may be formed of one or more components, and a name of a corresponding component element may be changed based on the type of electronic device. The electronic device according to the present disclosure may include one or more of the aforementioned components and may further include other additional components, or some of the aforementioned components may be omitted. Further, some of the components of the electronic device according to the embodiments of the present disclosure may be combined to form a single entity, and thus, may equivalently execute functions of the corresponding elements prior to the combination.

The term "module" used in the embodiments of the present disclosure refers to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the embodiments of the present disclosure may include at least one of an application-specific IC (ASIC) chip, a field-programmable gate array (FPGA), and a programmable-logic device for performing operations which have been known or are to be developed hereinafter.

According to embodiments, at least some of the devices such as modules or functions thereof, or methods according to the embodiments of the present disclosure may be implemented as, for example, instructions stored in a non-transitory computer readable storage media in the form of programming modules. When the command is executed by one or more processors, the one or more processors execute a function corresponding to the command. The computer-readable storage medium may be, for example, the memory 130. At least some of the programming modules may be implemented by the processor 120. At least some of the programming modules include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to embodiments of the present disclosure may be executed sequentially, in parallel, repeatedly, or in a heuristic manner. Further, some operations may be executed according to another order or may be omitted, or other operations may be added.

According to embodiments of the present disclosure, a storage medium stores instructions, which are set to enable at least one processor to execute at least one operation when the instructions are executed by at least one processor, and the one or more operations includes executing a web browser; requesting registration in an IMS using a first client associated with the web browser, and displaying, in a part of the web browser using the first client, information associated with the network to which the electronic device is connected.

The embodiments of the present disclosure disclosed in the specification and the drawings are only particular examples disclosed in order to easily describe the technical matters of the present disclosure and help with comprehension of the present disclosure, and do not limit the scope of the present disclosure. Therefore, in addition to the embodiments disclosed herein, the scope of the embodiments of the present disclosure should be construed to include all modifications or modified forms drawn based on the technical idea of the embodiments of the present disclosure.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of an electronic device, the method comprising:

executing a web browser;

based on executing the web browser, receiving, by using the web browser, a web page including data for loading a first client which is for communicating with an internet protocol (IP) multimedia core network subsystem (IMS), from a web server;

loading the first client based on the data for loading the first client included in the web page;

establishing, by using the first client, a communication with the IMS;

requesting, by using the first client, a registration to the IMS through the communication which is established by using the first client;

displaying at least one object corresponding to at least one service related to the IMS, in a first part of an execution screen of the web browser based on the web page;

in response to a user input for selecting a first object among the at least one object being received on the execution screen of the web browser, displaying, by using the first client, first information associated with a first service corresponding to the first object among the at least one service, wherein the first information is received through the communication which is established by using the first client from the IMS based on a result of the registration; and displaying second information associated with a network to which the electronic device is connected in a second part of the execution screen of the web browser, wherein at least one of the first information and the second information includes at least one of a notification indicating that a voice over long term evolution (VoLTE) call is currently executed, a notification indicating that packet communication is executed over an IMS packet data network (PDN), a notification indicating that a call is executed through a secure channel, a notification that indicates switching between long term evolution (LTE) and WiFi, and a notification indicating that LTE and WiFi are used simultaneously.

2. The method of claim 1, wherein the electronic device comprises:
- a communication processor (CP) that is configured to communicate with the IMS or a 3rd generation partnership project (3GPP)/3rd generation partnership project 2(3GPP2) circuit switched (CS) network; and
- a telephony module that is configured to communicate with the CP, and
- the method further comprises:
- requesting, by the telephony module, a communication connection between the electronic device and a packet data network (PDN), from the CP according to a control using a first application programming interface (API); and
- establishing, by the CP, the communication connection between the electronic device and the PDN.

3. The method of claim 1, wherein the electronic device comprises: a communication processor (CP) that is configured to communicate with the IMS or a 3rd generation partnership project (3GPP)/3rd generation partnership project 2(3GPP2) circuit switched (CS) network; and
- a telephony module that is configured to communicate with the CP, and
- the method further comprises:
- requesting, by the telephony module, the subscriber identification information from the CP according to a control using a second application programming interface (API);
- obtaining, by the CP, the subscriber identification information that is stored in a subscriber identification module (SIM); and
- transmitting a registration message including the subscriber identification information to the IMS.

4. The method of claim 1, further comprising:
- obtaining subscriber identification information that is stored in a subscriber identification module (SIM) using a communication processor (CP) of the electronic device;
- transmitting, to the IMS, a registration message including the subscriber identification information and web socket connection information;
- receiving an authentication request message from the IMS; and
- transmitting the authentication request message to the SIM through the CP using a second application programming interface (API), and obtaining an authentication response value; and
- transmitting a message that includes the authentication response value, to the IMS.

5. The method of claim 1, wherein displaying the information comprises:
- receiving, from a communication processor (CP) through a telephony module, at least one of information associated with a network to which the electronic device is connected and characteristic information of a channel that the electronic device currently uses; and
- displaying the received information through the web browser.

6. The method of claim 1, wherein the at least one object includes execution instruction of the at least one service from among a voice call, a video call, sharing an image, and peer to peer (P2P) file transmission using partner identification information.

7. The method of claim 1,
wherein the first client is configured to control the web browser and to provide a real time communication service, and
wherein the electronic device comprises:
- a communication processor (CP) that is configured to communicate with the IMS or a 3rd generation partnership project (3GPP)/3rd generation partnership project 2(3GPP2) circuit switched (CS) network; and
- a media proxy that is configured to communicate with each of the first client and the CP, and
the method further comprises:
- receiving, by the media proxy, real time communication data from the CP;
- converting, by the media proxy, a format of the real time communication data into a format supported by the web browser; and
- transmitting, by the media proxy, the real time communication data of which the format is converted, to the first client.

8. The method of claim 1,
wherein the first client is configured to control the web browser and to provide a real time communication service, and
wherein the electronic device comprises:
- a second client that is configured to control a phone application and to provide a real time communication service;
- a communication processor (CP) that is configured to communicate with the IMS or a 3rd generation partnership project (3GPP)/3rd generation partnership project 2(3GPP2) circuit switched (CS) network; and
- a media proxy that is configured to communicate with each of the first client, the second client, and the CP; and
the method further comprises:
- receiving, by the media proxy, first real time communication data from the CP;
- transmitting, by the media proxy, the first real time communication data to the first client;
- receiving a user input through the web browser;
- receiving, by the media proxy, second real time communication data from the CP;
- transmitting, by the media proxy, the second real time communication data to the second client in response to the user input; and
- outputting, by the second client, the second real time communication data through the phone application.

9. A non-transitory machine-readable storage medium that records a program for implementing a method of an electronic device, the method comprising:
- executing a web browser;
- based on executing the web browser, receiving, by using the web browser, a web page including data for loading a first client which is for communicating with an internet protocol (IP) multimedia core network subsystem (IMS), from a web server;
- loading the first client based on the data for loading the first client included in the web page;
- establishing, by using the first client, a communication with the IMS;
- requesting, by using the first client, a registration to the IMS through the communication which is established by using the first client;
- displaying at least one object corresponding to at least one service related to the IMS, in a first part of an execution screen of the web browser based on the web page; and
- in response to a user input for selecting a first object among the at least one object being received on the execution screen of the web browser, displaying, by using the first client, first information associated with a first service corresponding to the first object among the at least one service, wherein the first information is received through the communication which is established by using the first client from the IMS based on a result of the registration; and displaying second information associated with a network to which the electronic device is connected in a second part of the execution screen of the web browser, wherein at least one of the first information and the second information includes at least one of a notification indicating that a voice over long term evolution (VoLTE) call is currently executed, a notification indicating that packet communication is executed over an IMS packet data network (PDN), a notification indicating that a call is executed through a secure channel, a notification that indicates switching between long term evolution (LTE) and WiFi, and a notification indicating that LTE and WiFi are used simultaneously.

10. An electronic device, comprising:
a display;
a communication processor (CP) that is configured to communicate with an internet protocol (IP) multimedia core network subsystem (IMS) or 3rd generation partnership project (3GPP)/3rd generation partnership project 2(3GPP2) circuit switched (CS) network; and
a processor that is configured to:
execute a web browser,
based on executing the web browser, receive, by using the web browser, a web page including data for loading a first client which is for communicating with an internet protocol (IP) multimedia core network subsystem (IMS), from a web server,
load the first client based on the data for loading the first client included in the web page,
establish, by using the first client, a communication with the IMS,
request, by using the first client, a registration to the IMS through the communication which is established by using the first client,
display, on the display, at least one object corresponding to at least one service related to the IMS, in a first part of an execution screen of the web browser based on the web page,
in response to a user input for selecting a first object among the at least one object being received on the execution screen of the web browser, display, by using the first client, information associated with a first service corresponding to the first object among the at least one service, wherein the information is received through the communication which is established by using the first client from the IMS based on a result of the registration, and
display second information associated with a network to which the electronic device is connected in a second part of the execution screen of the web browser,
wherein at least one of the first information and the second information includes at least one of a notification indicating that a voice over long term evolution (VoLTE) call is currently executed, a notification indicating that packet communication is executed over an IMS packet data network (PDN), a notification indicating that a call is executed through a secure channel, a notification that indicates switching between long term evolution (LTE) and WiFi, and a notification indicating that LTE and WiFi are used simultaneously.

11. The electronic device of claim 10, wherein the controller is further configured to establish a communication connection between the electronic device and a packet data network (PDN) through the CP;
the communication connection includes a web socket connection; and
real time communication data is received from a partner device through the communication connection.

12. The electronic device of claim 10, wherein the controller is further configured to receive a user input associated with the use of a first application programming interface (API); and
to establish a communication connection between the electronic device and a PDN through the CP using the first API in response to the user input.

13. The electronic device of claim 10, wherein the controller is further configured to obtain subscriber identification information stored in a subscriber identification module (SIM) using the CP; and
to transmit a registration message including the subscriber identification information to the IMS through the CP, and
wherein the subscriber identification information includes at least one of an IP multimedia private identity (IMPI) and an IP multimedia public identity (IMPU).

14. The electronic device of claim 10, wherein the controller is further configured to obtain subscriber identification information stored in the SIM using the CP;
to transmit a registration message including the subscriber identification information to the IMS through the CP;
to receive an authentication request message from the IMS through the CP; and
to transmit a second message that includes an authentication response value to the IMS through the CP.

15. The electronic device of claim 10, wherein the controller is further configured to receive a user input through the web browser,
to establish a call connection between the electronic device and a partner device over the 3GPP/3GPP2 CS network through the CP, in response to the user input,
to convert real time communication data provided in a format supported by the web browser into real time communication data of a format that is supported by the 3GPP/3GPP2 CS network, and
to transmit, to the partner device through the CP, the real time communication data of which the format is converted.

16. The electronic device of claim 10, wherein the controller is further configured to receive real time communication data through a packet data network (PDN),
to receive a signal indicating a handover through the CP,
to receive real time communication data through the 3GPP/3GPP2 CS network that is connected through the handover in response to the signal indicating a handover, and
to convert a format of real time communication data that is received through the 3GPP/3GPP2 CS network into a format that is supported by the web browser.

17. The electronic device of claim 10, wherein the controller is further configured to receive a user input through the web browser,
to transmit a first message indicating the suspension of real time communication to the IMS through the CP in response to the user input,
to transmit a second message indicating the resumption of real time communication to the IMS through the CP, and to output real time communication data received from a partner device using a phone application.

* * * * *